(12) United States Patent
Matsunaga

(10) Patent No.: US 9,548,909 B2
(45) Date of Patent: Jan. 17, 2017

(54) COMMUNICATION DEVICE, PACKET MONITORING METHOD, AND COMPUTER PROGRAM

(71) Applicant: Sony Corporation, Minato-ku (JP)

(72) Inventor: Osamu Matsunaga, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 121 days.

(21) Appl. No.: 14/549,004

(22) Filed: Nov. 20, 2014

(65) Prior Publication Data
US 2015/0172142 A1    Jun. 18, 2015

(30) Foreign Application Priority Data

Dec. 17, 2013   (JP) ................................ 2013-260464

(51) Int. Cl.
    *H04L 1/00*       (2006.01)
    *H04L 12/26*      (2006.01)
(52) U.S. Cl.
    CPC .......... *H04L 43/026* (2013.01); *H04L 43/028* (2013.01); *H04L 43/04* (2013.01)
(58) Field of Classification Search
    CPC ....... H04L 43/026; H04L 43/028; H04L 43/04
    See application file for complete search history.

(56) References Cited

U.S. PATENT DOCUMENTS

| 2006/0080094 | A1* | 4/2006 | Katayama | ........... G10L 21/0364 |
| | | | | 704/229 |
| 2007/0091789 | A1* | 4/2007 | Thukral | .................. H04L 69/14 |
| | | | | 370/216 |
| 2009/0028144 | A1* | 1/2009 | Blair | .................... H04L 63/0227 |
| | | | | 370/389 |
| 2013/0194949 | A1* | 8/2013 | Ruddick | ............... H04L 43/028 |
| | | | | 370/252 |
| 2014/0201838 | A1* | 7/2014 | Varsanyi | ............. H04L 63/1425 |
| | | | | 726/23 |

FOREIGN PATENT DOCUMENTS

| JP | 2002-64492 | 2/2002 |
| JP | 2002-64507 | 2/2002 |
| JP | 2005-294973 | 10/2005 |
| JP | 2005-294974 | 10/2005 |

* cited by examiner

*Primary Examiner* — Clemence Han
(74) *Attorney, Agent, or Firm* — Oblon, McClelland, Maier & Neustadt, L.L.P.

(57) ABSTRACT

There is provided a communication device including a network interface connected to a network, a packet collection unit configured to collect packets transmitted from the network interface and packets received by the network interface, a packet recording unit configured to select a packet to be recorded from the packets collected by the packet collection unit and to record the packet as recorded information, and a packet analysis unit configured to detect discontinuity of a packet ID of the packets collected by the packet collection unit. When the packet analysis unit detects discontinuity of a packet ID, the packet recording unit retains the recorded information that has been recorded.

11 Claims, 17 Drawing Sheets

FIG.11

| NUMBER | TRANSMISSION SOURCE ADDRESS | RECIPIENT ADDRESS | DEVICE CONNECTION | INTER-SWITCH CONNECTION | | | DEVICE CONNECTION |
|---|---|---|---|---|---|---|---|
| 1 | adrs1 | adrs2 | DEVICE A1(Nl_1)-A10 | A11-B10 | B11-C10 | C11-D10 | D11-DEVICE B1(Nl_1) |
| 2 | adrs3 | adrs4 | DEVICE A2(Nl_1)-A12 | A13-B12 | B13-C12 | C13-D12 | D13-DEVICE B2(Nl_1) |
| 3 | adrs5 | adrs6 | DEVICE A3(Nl_1)-A14 | A15-B14 | B15-C14 | C15-D14 | D15-DEVICE B2(Nl_1) |
| ⋮ | | | | | | | |

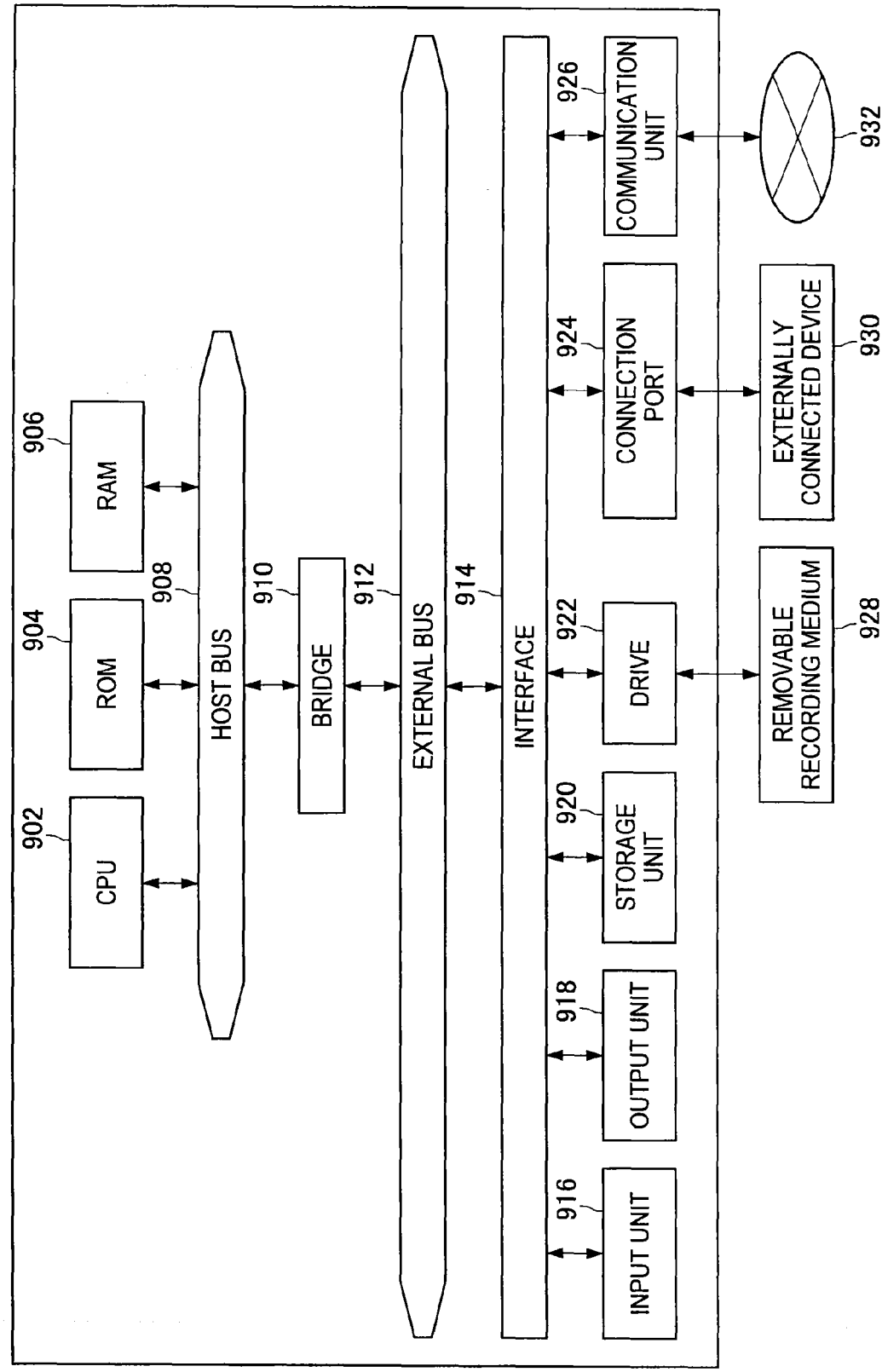

COMMUNICATION DEVICE, PACKET MONITORING METHOD, AND COMPUTER PROGRAM

CROSS REFERENCE TO RELATED APPLICATIONS

This application claims the benefit of Japanese Priority Patent Application JP 2013-260464 filed Dec. 17, 2013, the entire contents of which are incorporated herein by reference.

BACKGROUND

The present disclosure relates to a communication device, a packet monitoring method, and a computer program.

Technologies for acquiring and retaining packets on a network in order to discover causes of trouble occurring on the network have been disclosed (for example, refer to JP 2002-64492A, JP 2002-64507A, JP 2005-294973A, and JP 2005-294974A). Since the storage capacity of a network monitoring device that acquires and retains packets on a network is limited, there has been a demand for not only a packet retaining function that enables acquisition and retaining of packets but also an overwriting prevention function that enables prevention of overwriting of packets when an error occurs on the network.

SUMMARY

Such a network monitoring device with the packet retaining function further has to have functions other than the overwriting prevention function with respect to packet retaining data. Particularly, in a network system in which a plurality of data communication devices that have a network monitoring function are arranged on a network, a function of comprehensively managing and controlling the network monitoring function in order to cause the network monitoring to function effectively. Particularly, in a network system in which a plurality of data communication devices are arranged to communicate a plurality of different kinds of video data and audio data in massive amounts in real-time, efficient monitoring of states of the network has been strongly demanded.

Therefore, the present disclosure proposes a novel and advanced communication device, packet monitoring method, and computer program that enable efficient monitoring of similar communication flows that are generated in massive amounts.

According to an embodiment of the present disclosure, there is provided a communication device including a network interface connected to a network, a packet collection unit configured to collect packets transmitted from the network interface and packets received by the network interface, a packet recording unit configured to select a packet to be recorded from the packets collected by the packet collection unit and to record the packet as recorded information, and a packet analysis unit configured to detect discontinuity of a packet ID of the packets collected by the packet collection unit. When the packet analysis unit detects discontinuity of a packet ID, the packet recording unit retains the recorded information that has been recorded.

According to an embodiment of the present disclosure, there is provided a packet monitoring method including collecting packets transmitted from a network interface connected to a network and packets received by the network interface, selecting a packet to be recorded from the collected packets and recording the packet as recorded information, detecting discontinuity of a packet ID of the collected packets, and stopping recording of the recorded information and retaining the recorded information when discontinuity of a packet ID is detected.

According to an embodiment of the present disclosure, there is provided a computer program causing a computer to execute collecting packets transmitted from a network interface connected to a network and packets received by the network interface, selecting a packet to be recorded from the collected packets and recording the packet as recorded information, detecting discontinuity of a packet ID of the collected packets, and stopping recording of the recorded information and retaining the recorded information when discontinuity of a packet ID is detected.

According to one or more of embodiments of the present disclosure described above, a novel and advanced communication device, packet monitoring method, and computer program that enable efficient monitoring of similar communication flows that are generated in massive amounts can be provided.

Note that the effect described above is not necessarily limiting, and along with or instead of the effect, any effect that is desired to be introduced in the present specification or other effects that can be expected from the present specification may be exhibited.

BRIEF DESCRIPTION OF THE DRAWINGS

FIG. 11 is an illustrative diagram showing an example of content of a connection table;

FIG. 17 is an illustrative diagram showing a hardware configuration example.

DETAILED DESCRIPTION OF THE EMBODIMENT(S)

Figure 1:
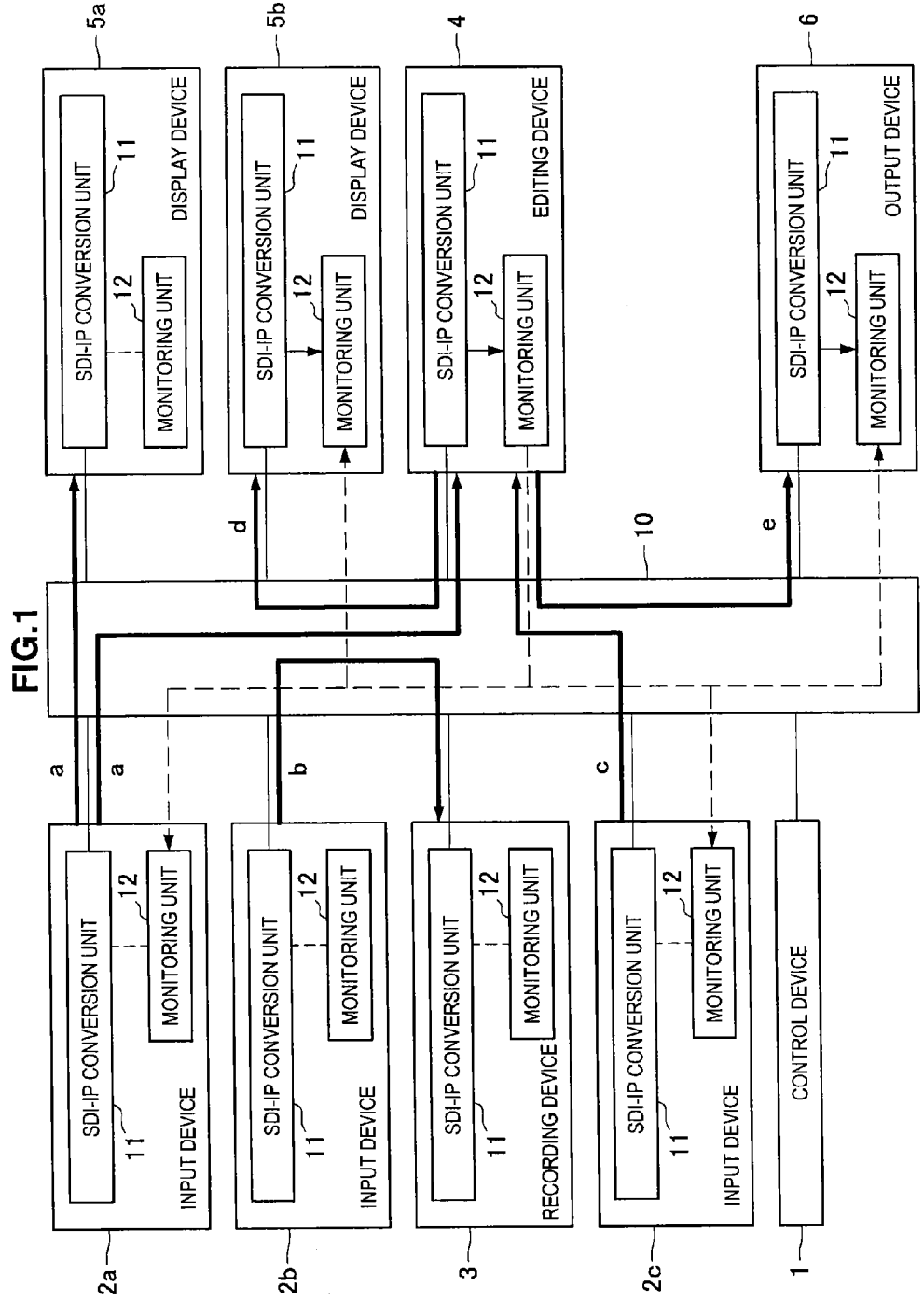
FIG. 1 is an illustrative diagram showing a configuration example of a video editing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. Embodiment of the present disclosure
   1.1. System configuration example
   1.2. Configuration example of a communication device
   1.3. System operation example at the time of executing a network monitoring function
   1.4. Functional configuration example of a control device
   1.5. Operation example of a communication device
2. Hardware configuration example
3. Conclusion

1. Embodiment of the Present Disclosure

[1.1. System Configuration Example]
(First Configuration Example)

First, an embodiment of the present disclosure will be described with reference to drawings. FIG. 1 is an illustrative diagram showing a configuration example of a video editing system according to an embodiment of the present disclosure. Hereinbelow, the configuration example of the video editing system according to the embodiment of the present disclosure will be described using FIG. 1.

The video editing system shown in FIG. 1 is configured to include a control device 1, input devices 2a, 2b, and 2c, a recording device 3, an editing device 4, display devices 5a and 5b, and an output device 6. The control device 1, the input devices 2a, 2b, and 2c, the recording device 3, the editing device 4, the display devices 5a and 5b, and the output device 6 are connected to one another on a network via a network switch group 10.

The control device 1 is a device that sets routes of communication flows between the respective devices. FIG. 1 exemplifies a state of five communication flows set by the control device 1, which includes a flow a transmitted from the input device 2a to the display device 5a and the editing device 4, a flow b transmitted from the input device 2b to the recording device 3, a flow c transmitted from the input device 2c to the editing device 4, a flow d transmitted from the editing device 4 to the display device 5b, and a flow e transmitted from the editing device 4 to the output device 6.

All of the input devices 2a, 2b, and 2c, the recording device 3, the editing device 4, the display devices 5a and 5b, and the output device 6 have a function of processing serial digital interface (SDI) signals. In addition, each of the input devices 2a, 2b, and 2c, the recording device 3, the editing device 4, the display devices 5a and 5b, and the output device 6 has an SDI-IP conversion unit 11 that converts SDI signals into Internet protocol (IP) signals and vice versa and a monitoring unit 12 that monitors states of the IP signals flowing on the network The monitoring unit 12 sets all flows exchanged between the SDI-IP conversion units 11 and the network switch group 10 as monitoring targets.

The video editing system shown in FIG. 1 has to perform real-time signal processing. Thus, as communication protocols of the communication flows, a user datagram protocol (UDP) and a real-time transport protocol (RTP) are used. When the UDP and RTP are used as the communication protocols, redundant designing of a device or a route or installation of an error correction function is necessary in order to avoid deterioration in video quality attributable to a packet error, unlike a transmission control protocol (TCP). The redundant design or the error correction function has to be maintained in a range in which it works effectively by monitoring the severity of the error and the spot at which the error occurs in the individual communication flows at all times, while the video quality does not deteriorate due to an effective operation of the redundantly designed device or route or the error correction function.

FIG. 1 illustrates the state in which the monitoring unit 12 of the editing device 4 sets transmission and reception flows of its own device as monitoring targets and remotely sets the monitoring units 12 of each of the devices that relate to the transmission and reception flows as indicated by the dashed lines. In other words, since communication flows in which the editing device 4 is involved are a, c, d, and e, FIG. 1 illustrates the state in which the monitoring unit 12 of the editing device 4 remotely sets the monitoring units 12 of the input devices 2a and 2c, the display device 5b, and the output device 6.

In the example shown in FIG. 1, the editing device 4 executes monitoring of the reception states of the communication flow a and the communication flow c using its own monitoring unit 12, and remotely sets the monitoring unit 12 of the input device 2a that is a transmission source of the communication flow a to monitor the transmission state of the communication flow a. Likewise, with respect to the communication flow c, the monitoring unit remotely sets the monitoring unit 12 of the input device 2c to monitor the transmission state of the communication flow c, with respect to the communication flow d, remotely sets the monitoring unit 12 of the display device 5b to monitor the reception state of the communication flow d, and with respect to the communication flow e, remotely sets the monitoring unit 12 of the output device 6 to monitor the reception state of the communication flow e.

When the flow a is focused, the transmission state from the input device 2a is monitored and the reception state of the editing device 4 is monitored. There are many common items to be set in the monitoring unit 12 of the input device 2a and the monitoring unit 12 of the editing device 4, beginning from network address information of the flow a that is a monitoring target.

The monitoring unit 12 executes an operation of recording packet data as a monitoring operation. The packet data recording operation executed by the monitoring unit 12 depends on the content of the items to be set in the monitoring unit 12. As the content of the items, there are settings of, for example, execution of periodic recording and analysis, a start of recording (overwriting recording) when a specific start condition is satisfied, a stop of recording (overwriting recording) when a specific stop condition is satisfied, and the like.

Note that the communication flow b between the input device 2b and the recording device 3 that has not been described above can be likewise remotely set as a monitoring target by the monitoring units 12 thereof.

As described above, by installing one of the monitoring units 12 which can perform remote controlling in each device that has the function of processing SDI signals, the video editing system according to the embodiment of the present disclosure can monitor the same communication flow at a plurality of places at the same time. By monitoring the same communication flow at the plurality of places at the same time, the video editing system according to the embodiment of the present disclosure can exhibit effects not only of specifying the cause of the occurrence of a fault but also of issuing a warning about a fault.

Figure 2:
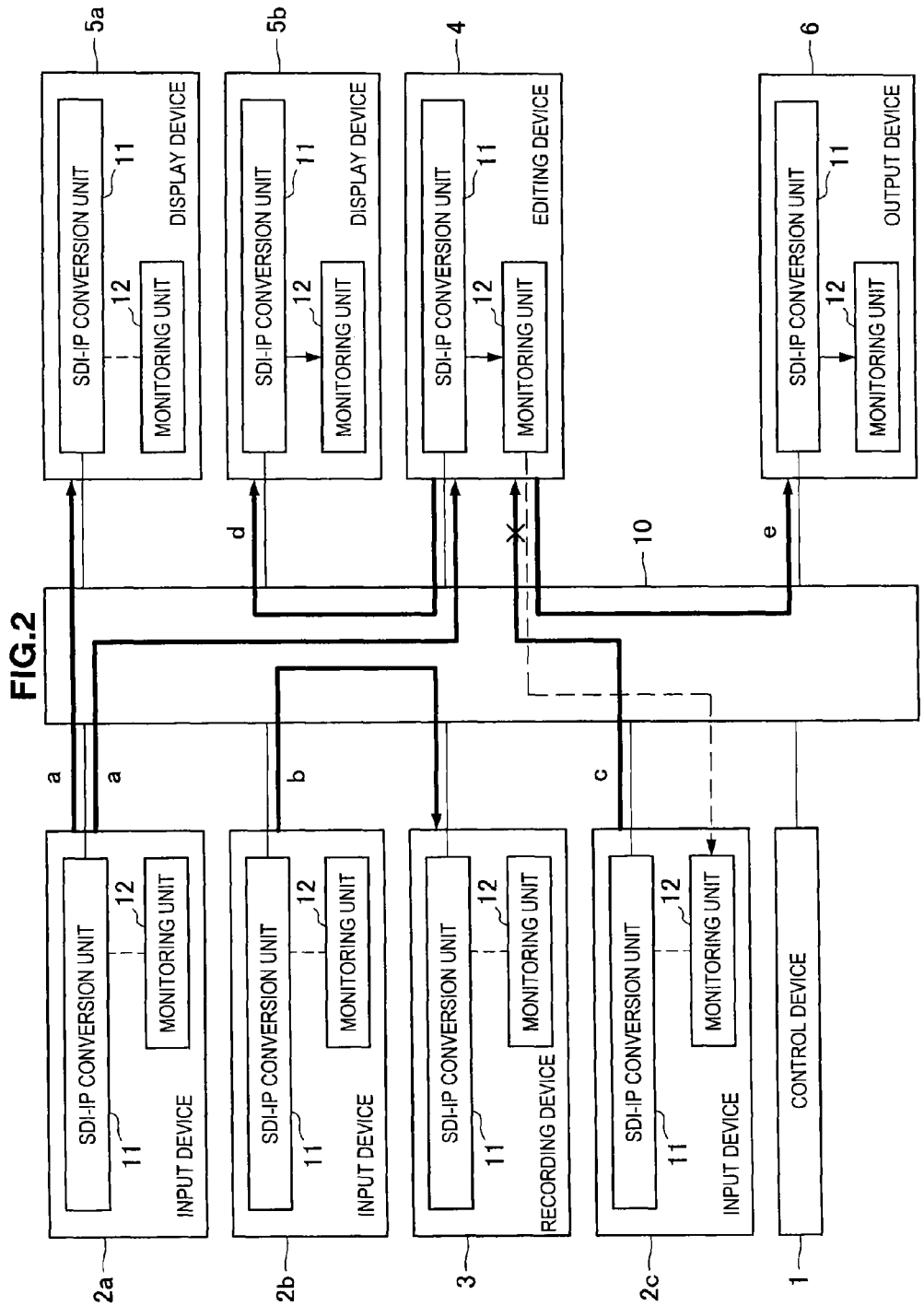
FIG. 2 is an illustrative diagram for describing an operation performed when a packet error is detected in the video editing system.

FIG. 2 is an illustrative diagram for describing an operation performed when a packet error is detected in the video editing system according to the embodiment of the present disclosure shown in FIG. 1. Hereinbelow, an operation performed when the monitoring unit 12 of the editing device 4 has detected a packet error in the communication flow c from the input device 2c to the editing device 4 will be described.

When a packet error has been detected in the communication flow c, the monitoring unit 12 of the editing device 4 remotely sets the monitoring unit 12 of the input device 2c to execute monitoring of the communication flow c as indicated by the dashed line of FIG. 2. When the monitoring unit 12 of the input device 2c has been set by the monitoring unit 12 of the editing device 4 to execute monitoring of the communication flow c, the monitoring unit 12 of the editing device 4 and the monitoring unit 12 of the input device 2c monitor the communication flow c at the same time thereafter.

As the monitoring unit 12 of the editing device 4 and the monitoring unit 12 of the input device 2c monitor the communication flow c at the same time, it is possible to determine whether or not packets corresponding to the packet error detected by the monitoring unit 12 of the editing device 4 have actually been transmitted from the input device 2c. Monitoring the communication flow c by the monitoring unit 12 of the editing device 4 and the monitoring unit 12 of the input device 2c at the same time contributes to the work of specifying the cause of the occurrence of a fault.

Note that the above description is based on the premise that items that should be set in the monitoring unit 12 of the input device 2c serving as a transmission source of the communication flow c are remotely set by the monitoring unit 12 of the editing device 4, but the execution of the monitoring operation is not instructed remotely by the monitoring unit 12 of the editing device 4. However, when the monitoring unit 12 of the editing device 4 detects a packet error, the monitoring unit 12 of the editing device 4 is assumed to remotely instruct the monitoring unit 12 of the input device 2c to execute the monitoring operation.

It is also possible to set a different operation in the monitoring unit 12 of the input device 2c. For example, monitoring can be executed by a plurality of devices at the same time using the condition of receiving packets that support a change of a route setting as a start condition in order to ascertain whether or not packet errors tend to concentrate on the time point at which the route setting of a communication flow between the devices is changed.

(Second Configuration Example)

Figure 3:
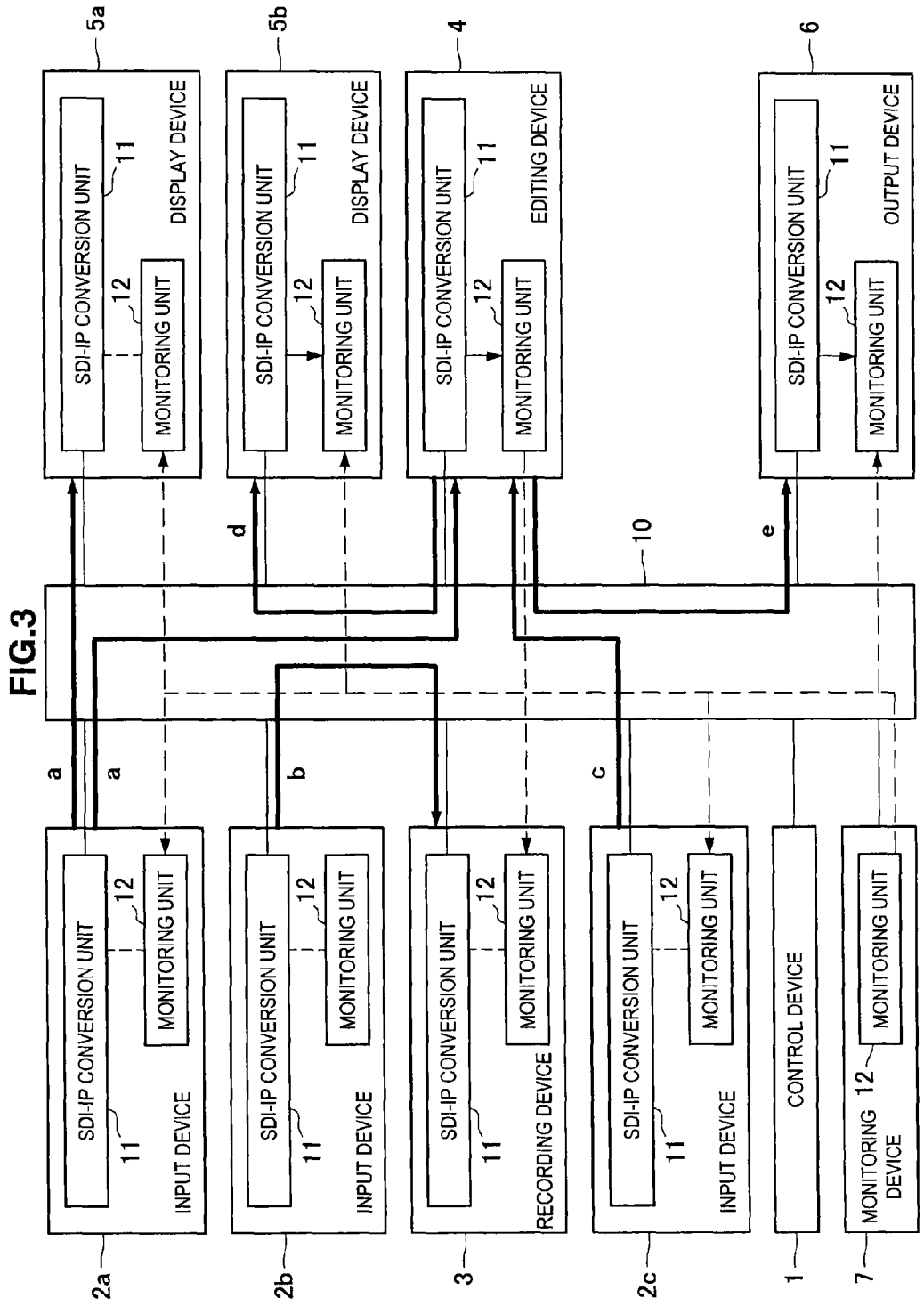
FIG. 3 is an illustrative diagram showing a configuration example of a video editing system according to an embodiment of the present disclosure.

Another example of the video editing system will be introduced. FIG. 3 is an illustrative diagram for describing a configuration example of a video editing system according to an embodiment of the present disclosure. Hereinbelow, the configuration example of the video editing system according to the embodiment of the present disclosure will be described using FIG. 3.

The video editing system according to the embodiment of the present disclosure shown in FIG. 3 is provided with a monitoring device 7 in addition to the video editing system shown in FIG. 1 as a monitoring dedicated device. The monitoring device 7 includes the monitoring unit 12 like other devices that have the function of processing SDI signals.

As shown in FIG. 3, when the monitoring device 7 is provided in the video editing system as a monitoring dedicated device, the monitoring units 12 of all the devices that have the function of processing SDI signals are remotely set. Note that information of the route of each communication flow which is necessary for the setting is acquired from the control device 1. In FIG. 3, each of the communication flows is assumed to be set by the control device 1 as in FIG. 1.

Figure 4:
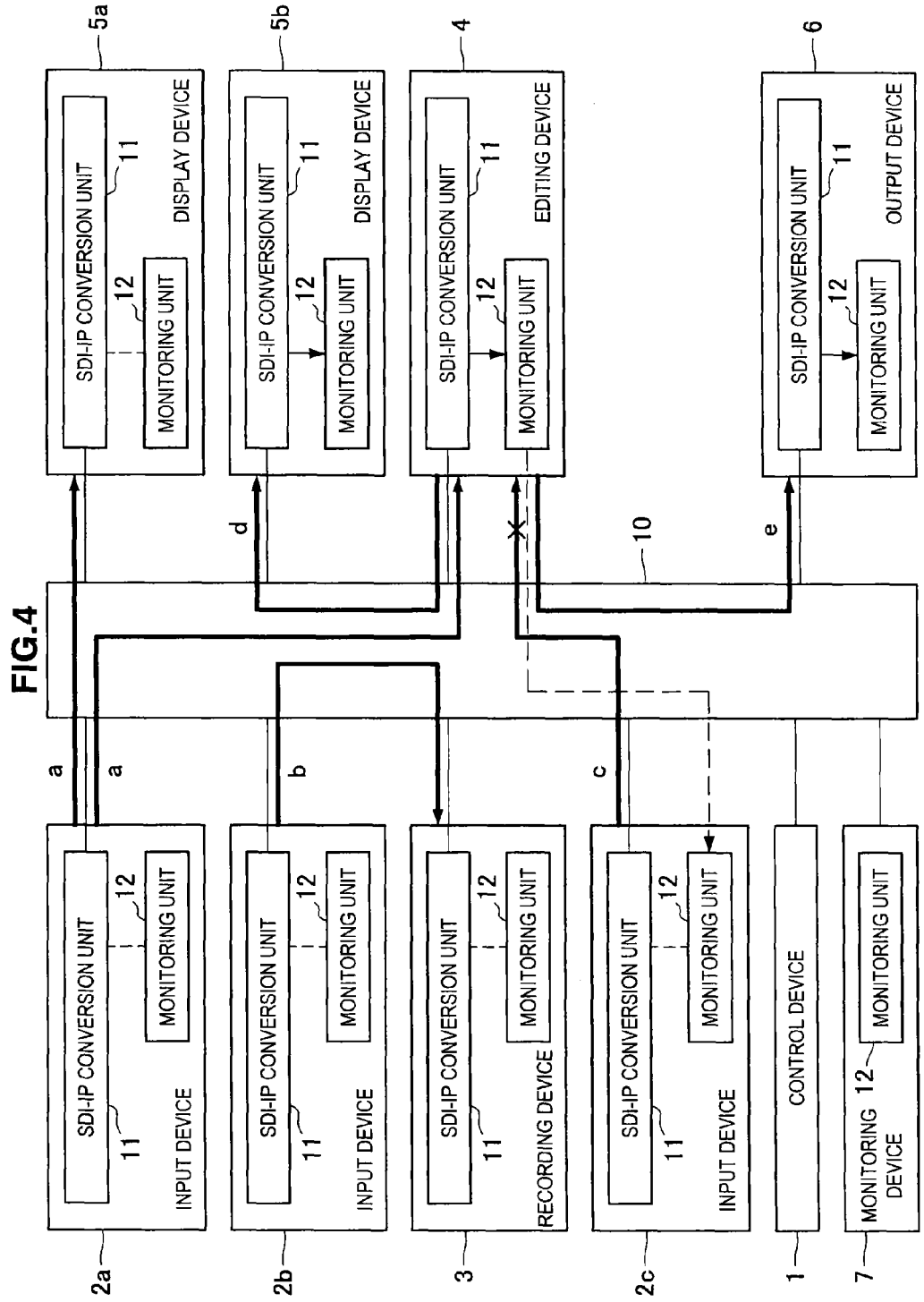
FIG. 4 is an illustrative diagram for describing an operation performed when a packet error is detected in the video editing system.

An operation performed in the video editing system configured as in FIG. 3 when the monitoring unit 12 of the editing device 4 has detected a packet error in the communication flow c as in FIG. 2 will be described. FIG. 4 is an illustrative diagram for describing the operation performed when a packet error has been detected in the video editing system according to the embodiment of the present disclosure shown in FIG. 3. Hereinbelow, the operation performed when the monitoring unit 12 of the editing device 4 detects a packet error in the communication flow c from the input device 2c to the editing device 4 will be described.

When the packet error has been detected in the communication flow c, the monitoring unit 12 of the editing device 4 remotely sets the monitoring unit 12 of the input device 2c to execute monitoring of the communication flow c as indicated by the dashed line of FIG. 4. When the monitoring unit 12 of the input device 2c is remotely set by the monitoring unit 12 of the editing device 4 to execute monitoring of the communication flow c, the monitoring unit 12 of the editing device 4 and the monitoring unit 12 of the input device 2c monitor the communication flow c at the same time thereafter.

In the example shown in FIG. 4, the monitoring unit 12 of the editing device 4 performs the remote setting directly in the monitoring unit 12 of the input device 2c, however, the monitoring unit 12 of the editing device 4 may performs the remote setting in the monitoring unit 12 of the input device 2c via the monitoring device 7.

Figure 5:
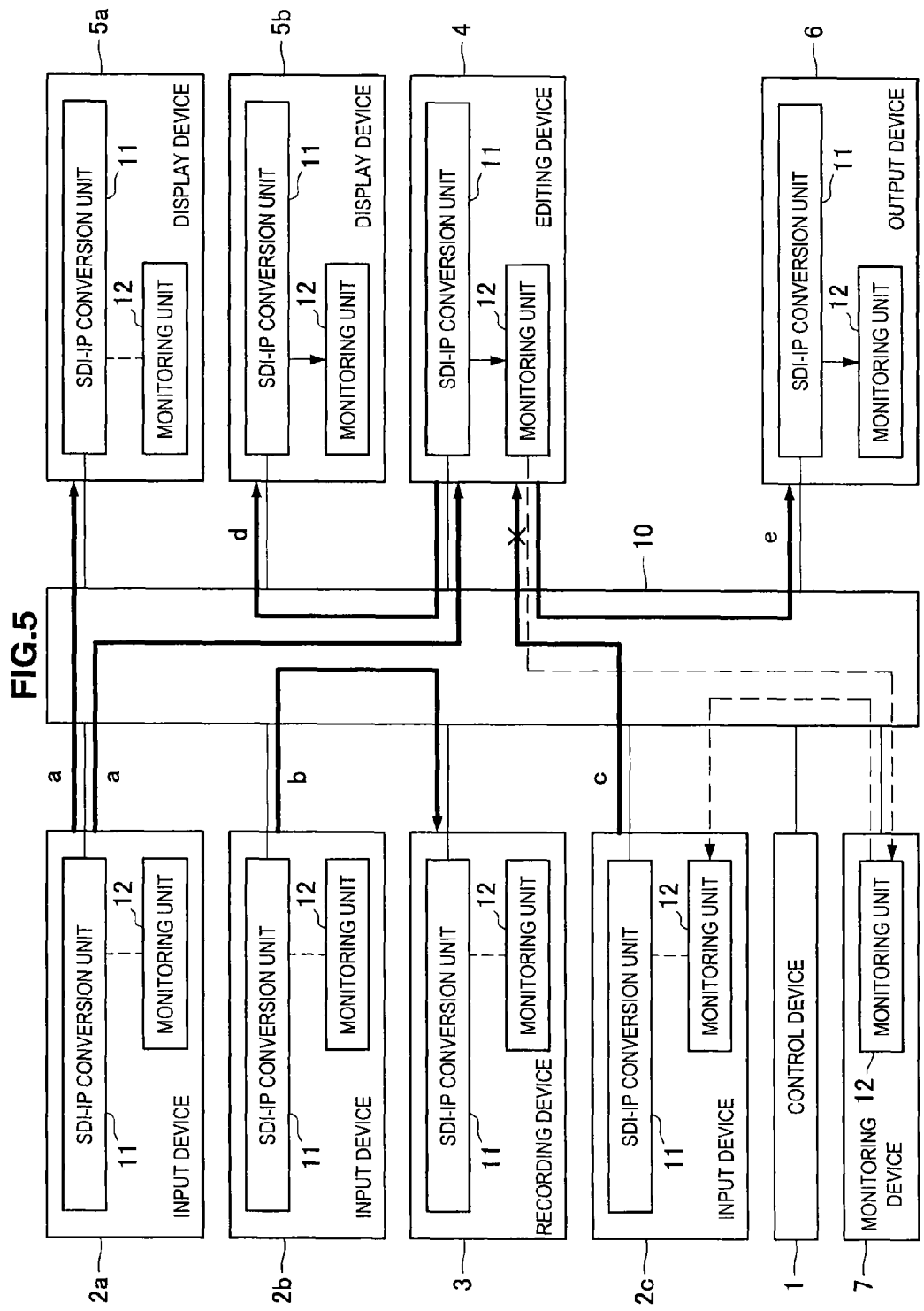
FIG. 5 is an illustrative diagram for describing an operation performed when a packet error is detected in the video editing system.

FIG. 5 is an illustrative diagram for describing an operation performed when a packet error has been detected in the video editing system according to the embodiment of the present disclosure shown in FIG. 3. Hereinbelow, the operation performed when the monitoring unit 12 of the editing device 4 has detected the packet error in the communication flow c from the input device 2c to the editing device 4 will be described.

When the packet error has been detected in the communication flow c, the monitoring unit 12 of the editing device 4 remotely sets the monitoring unit 12 of the monitoring device 7 to execute monitoring of the communication flow c as indicated by the dashed line of FIG. 5. Upon receiving the setting from the monitoring unit 12 of the editing device 4, the monitoring unit 12 of the monitoring device 7 remotely sets the monitoring unit 12 of the input device 2c to execute monitoring of the communication flow c as indicated by the dashed line of FIG. 5. As the monitoring unit 12 of the input device 2c is remotely set by the monitoring unit 12 of the monitoring device 7 to execute the monitoring of the communication flow c, the monitoring unit 12 of the editing device 4 and the monitoring unit 12 of the input device 2c monitor the communication flow c at the same time thereafter.

As described above, as the monitoring unit 12 of the editing device 4 and the monitoring unit 12 of the input device 2c monitor the communication flow c at the same time, it is possible to determine whether or not packets corresponding to the packet error detected by the monitoring unit 12 of the editing device 4 have actually been transmitted from the input device 2c. Monitoring the communication flow c by the monitoring unit 12 of the editing device 4 and the monitoring unit 12 of the input device 2c at the same time contributes to the work of specifying the cause of the occurrence of a fault. In addition, in the video editing system according to the embodiment of the present disclosure shown in FIG. 3, by transmitting packet data obtained by the monitoring unit 12 of the editing device 4 and the monitoring unit 12 of the input device 2c to the monitoring unit 12 of the monitoring device 7, monitoring results can be collectively processed in the monitoring device 7.

(Third Configuration Example)

Figure 6:
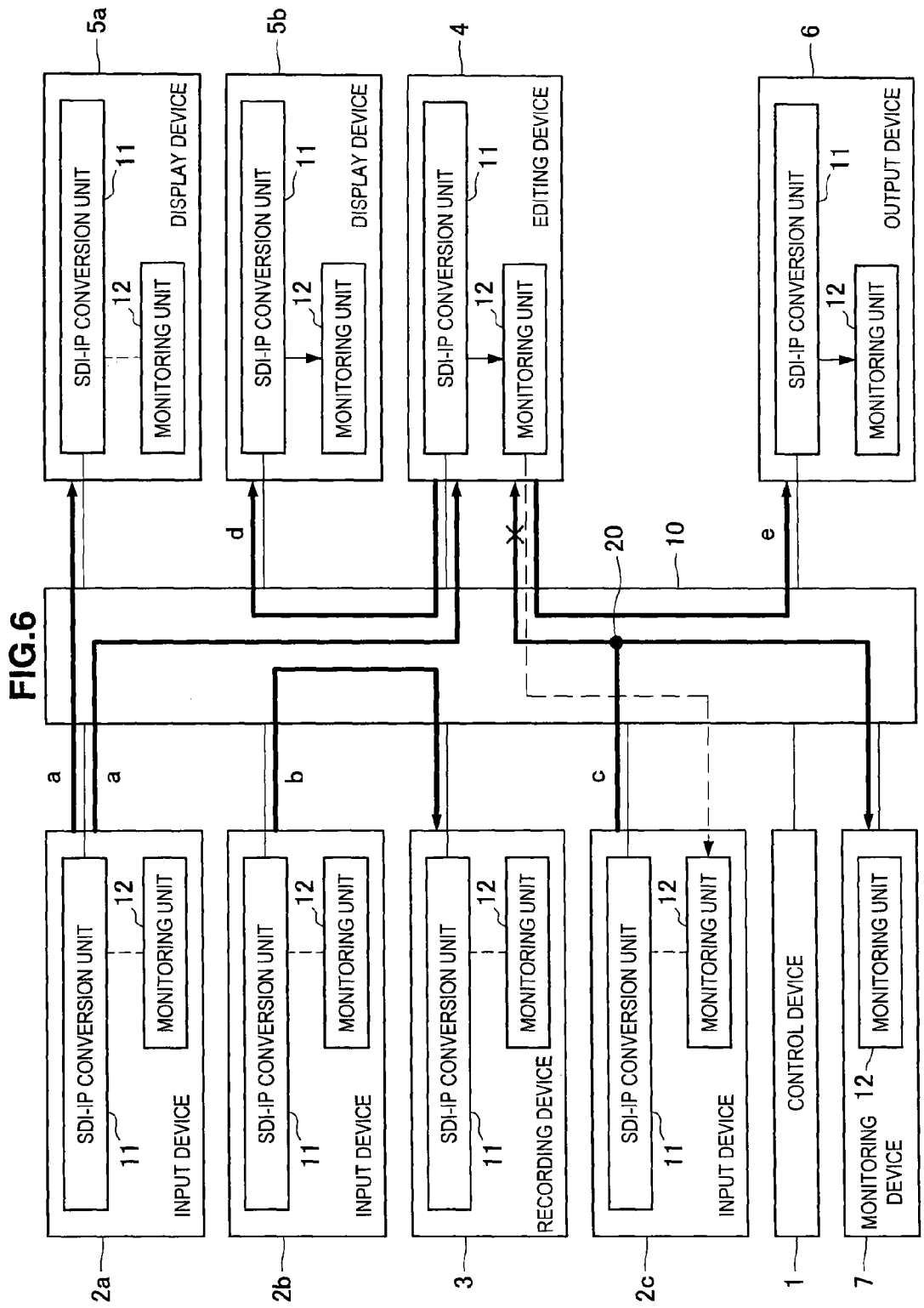
FIG. 6 is an illustrative diagram showing a configuration example of a video editing system according to an embodiment of the present disclosure.

Another example of the video editing system will be introduced. FIG. 6 is an illustrative diagram showing a configuration example of a video editing system according to an embodiment of the present disclosure. Hereinbelow, the configuration example of the video editing system according to the embodiment of the present disclosure will be described using FIG. 6.

The video editing system according to the embodiment of the present disclosure shown in FIG. 6 is configured to also set a communication flow on a relay point 20 provided on a network of the video editing system shown in FIG. 3 as a monitoring target. Note that the relay point provided on the network is equivalent to a monitoring point of a tap that is inserted in-line in connection between switches when, for example, the video editing system is constituted by a plurality of network switches, or a port of a switch for which mirroring is set.

The video editing system according to the embodiment of the present disclosure shown in FIG. 6 can monitor communication flows at reception points, transmission points, and relay points at the same time by also setting the communication flow at the relay point 20 on the network as a monitoring target of each monitoring unit 12. Thus, the video editing system according to the embodiment of the present disclosure shown in FIG. 6 can execute the work of specifying the cause of occurrence of a fault more effectively. In addition, in the video editing system according to the embodiment of the present disclosure shown in FIG. 6, monitoring results can be collectively processed by the monitoring device 7 by transmitting packet data obtained by the monitoring unit 12 of the editing device 4 and the monitoring unit 12 of the input device 2c to the monitoring device 7.

So far, the configuration examples of the video editing systems according to the embodiments of the present disclosure have been described. Next, functional configuration examples of devices which are included in a video editing system according to an embodiment of the present disclosure and have a monitoring function will be described.

[1.2. Configuration Example of a Communication Device]

Figure 7:
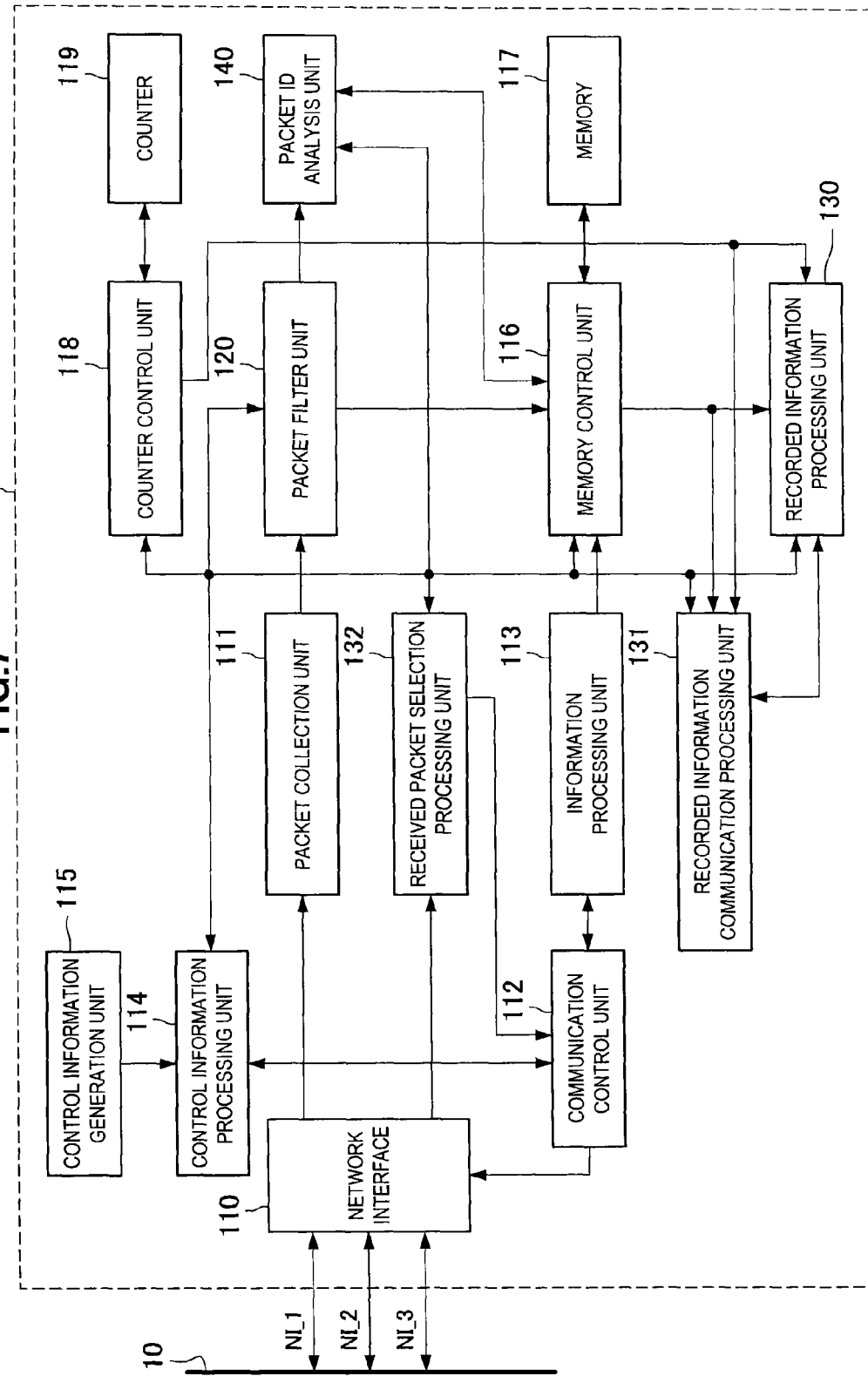
FIG. 7 is an illustrative diagram showing a functional configuration example of a communication device 100 according to an embodiment of the present disclosure.

FIG. 7 is an illustrative diagram showing a functional configuration example of a communication device 100 according to an embodiment of the present disclosure. The communication device 100 shown in FIG. 7 is a functional configuration example of each device with the monitoring function included in the video editing systems according to the embodiments of the present disclosure shown in FIGS. 1 to 6. Hereinbelow, the functional configuration example of the communication device 100 according to the embodiment of the present disclosure will be described using FIG. 7.

As shown in FIG. 7, the communication device 100 according to the embodiment of the present disclosure is configured to include a network interface 110, a packet collecting unit 111, a communication control unit 112, an information processing unit 113, a control information processing unit 114, a control information generation unit 115, a memory control unit 116, a memory 117, a counter control unit 118, a counter 119, a packet filter unit 120, a recorded information processing unit 130, a recorded information communication processing unit 131, a received packet selection processing unit 132, and a packet ID analysis unit 140.

The network interface 110 is connected to a network constituted by the network switch group 10 and executes transmission and reception of data with other devices. In addition, the network interface 110 exchanges packets with the communication control unit 112 that has the network functions of layer 2 or higher. Further, the network interface 110 transfers transmission packets and reception packets that have passed through the network interface 110 to the packet collection unit 111 for the purpose of monitoring the network.

In addition, the network interface 110 has three network interfaces NI_1, NI_2, and NI_3. In the present embodiment, description will be provided on the assumption that NI_1 is used for data communication, and NI_2 and NI_3 are used for network monitoring. All packets received by the three network interfaces NI_1, NI_2, and NI_3 are transferred to the packet collection unit 111 in the present embodiment.

A case in which the same packets as those of video data and audio data which are packets for a communication service of the communication device 100 received by the network interface NI_1 are overlappingly received by the network interfaces NI_2 and NI_3 which are used for network monitoring can occur. When such overlapping reception occurs, there is a possibility of the communication service of the communication device 100 not functioning normally. Thus, in the present embodiment, the received packet selection processing unit 132 resolves the overlapping reception of packets.

The packet collection unit 111 acquires the transmission packets and the reception packets that have passed the network interface 110 from the network interface 110. Then, the packet collection unit 111 transfers the packets acquired from the network interface 110 to the packet filter unit 120.

The communication control unit 112 exchanges packets with the network interface 110. In addition, the communication control unit 112 executes communication of information with the information processing unit 113, the control information processing unit 114, and the recorded information communication processing unit 131.

The information processing unit 113 executes processing of data for the communication service of the communication device 100, for example, processing of the video data and the audio data and processing of information relating to operation control of the communication device 100. In addition, the information processing unit 113 transfers log information and event information generated in the course of processing information to the memory control unit 116 and the counter control unit 118 in order to generate information relating to operation control of the memory 117.

The control information generation unit 115 generates information that is used in operations of the network monitoring function of the communication device 100 (control information) using, for example, hardware such as a keyboard, a mouse, and a display or software such as a user interface none of which is illustrated.

The control information is broadly classified into, for example, information for setting a communication flow, information for setting a condition for a packet recording operation, information for setting content of packet recording information of packets, information for setting a monitoring operation, and the like.

The information for setting a communication flow can include, for example, network addresses of devices serving as a recipient and a transmission source, information of a communication protocol, and the like.

The information for setting a condition for a packet recording operation can include, for example, a memory size, a condition for overwriting permission or prohibition, a condition for starting recording, a condition for stopping recording, information of packets to be recorded, information of packets to be counted, information of a cycle of recording, and the like.

The information for setting content of packet recording information can include, for example, information of a recording site in a packet (which is also referred to hereinafter as packet data notation) and the like.

The information for setting a monitoring operation can include, for example, settings of naming and retaining or discarding data, analyzing data in its own device or transferring data to another device, using only recorded information of its own device or also using recorded information of another device, allowing or not allowing remote control, allowing or not allowing SNMP TRAP transfer, and the like.

The control information described above is merely an example, and it is needless to say that the control information is not limited to the information and settings.

Based on the control information generated by the control information generation unit 115, the control information processing unit 114 computes information necessary in each processing block and then transfers the information to each processing block. Processing blocks with which the control information processing unit 114 exchanges the control information include the memory control unit 116 which controls a writing operation and a reading operation with respect to the memory 117, the counter control unit 118 which controls the counter 119 which counts the number of transmissions and receptions of designated given packets, the packet filter unit 120 which specifies packet data recorded in the memory 117 from collected transmitted and received packets, specifies packets to be counted, and generates data for memory control for controlling the memory 117, the recorded information processing unit 130 which collects packet data and count values that are recorded information and organizes the recorded information, the recorded information communication processing unit 131 which communicates the packet data and the count values that are recorded information to another device, the received packet selection processing unit 132 which resolves overlapping reception of packets, and the packet ID analysis unit 140 which detects continuity of packets and generates control data for controlling writing on the memory 117 and reading data from the memory 117.

When one piece of the control information includes information of a memory size, for example, the control information processing unit 114 performs processing of computing the value of a memory address that will be actually used based on the information of the memory size and writing the value in a register that retains memory address values of the memory control unit 116.

In addition, the control information processing unit 114 has a function of confirming the control information generated by the control information generation unit 115 and a function of transferring the control information to another device via the communication control unit 112.

The memory control unit 116 controls the writing operation and the reading operation of the memory 117 based on information transmitted from the control information processing unit 114. The memory control unit 116 sets a size and an address of the memory 117 on which packets are recorded based on the information transmitted from the control information processing unit 114 and records the packets on the memory 117, or reads the packets recorded on the memory 117. When, for example, a packet error has been detected, the memory control unit 116 reads packets from the memory 117 and transmits them to the recorded information processing unit 130.

The counter control unit 118 controls the counter 119 which counts the number of transmissions and receptions of predetermined given packets based on the information transmitted from the control information processing unit 114. When, for example, a packet error has been detected, the counter control unit 118 reads the count value counted by the counter 119 and transmits the value to the recorded information processing unit 130.

The packet filter unit 120 specifies packet data recorded on the memory 117 from transmitted and received packets collected by the packet collection unit 111, specifies packets to be counted, and generates memory control data for controlling the memory 117 based on the information transmitted from the control information processing unit 114. A configuration example of the packet filter unit 120 will be described later in detail.

The recorded information processing unit 130 collects the packet data and the count values which are recorded information from the memory control unit 116 and the counter control unit 118 and organizes the recorded information based on the information transmitted from the control information processing unit 114. For example, the recorded information processing unit 130 puts the recorded information collected by the memory control unit 116 and the counter control unit 118 in order of generation.

The recorded information communication processing unit 131 has functions of communicating the packet data and the count values that are the recorded information organized by the recorded information processing unit 130 to another device and outputting the recorded information organized by the recorded information processing unit 130 using hardware such as a keyboard, a mouse, and a display or software such as a user interface none of which is illustrated.

The received packet selection processing unit 132 resolves overlapping of packets received by the network interface 110 which has the three network interfaces NI_1, NI_2, and NI_3. When the overlapping of the packets is to be resolved by the received packet selection processing unit 132, an intermediate format in which a network interface number for identifying, for example, through which network interface the packets will be transmitted and through which network interface the packets have been received is added to the head of an Ethernet (a registered trademark) frame is introduced. The received packet selection processing unit 132 operates so as to transmit packets received only by, for example, NI_1 to the communication control unit 112 with reference to the intermediate format.

The packet ID analysis unit 140 detects discontinuity of a packet, and generates control data for controlling writing on the memory 117 and reading from the memory 117. The packet ID analysis unit 140 has two operation patterns which include one in which the unit operates to detect continuity of packets filtered by the packet filter unit 120 and generate control data and one in which the unit operates to detect continuity of packets read by the memory control unit 116 and generate control data. The control information processing unit 114, for example, may instruct the packet ID analysis unit to operate in any of the operation patterns.

The packet ID analysis unit 140 may detect discontinuity of a packet ID by detecting, for example, discontinuity of the identifier of the IPv4 header, and may detect discontinuity of a packet ID by detecting discontinuity of the identifier of the IPv6 extension header.

Upon detecting discontinuity of a packet and generating control data, the packet ID analysis unit 140 transmits the generated control data to the memory control unit 116. Upon receiving the control data from the packet ID analysis unit 140, the memory control unit 116 stops writing on the memory 117, and transfers packets of a predetermined range out of the packets written on the memory 117 to an area for retention of the memory 117 to retain the packets of the predetermined range.

In the configuration of the communication device 100 shown in FIG. 7, the information processing unit 113 corresponds to the SDI-IP conversion unit 11 of each device shown in FIGS. 1 to 6. Thus, the information processing unit 113 has the function of converting SDI signals into IP signals and vice versa. In addition, in the configuration of the communication device 100 shown in FIG. 7, the configuration other than the information processing unit 113 corresponds to the monitoring unit 12 of each device shown in FIGS. 1 to 6.

The communication device 100 according to the present embodiment allows overlapping reception of packets. By allowing the overlapping reception of packets, the communication device 100 according to the present embodiment can monitor the same communication flow over a plurality of positions on the network. Thus, the communication device 100 according to the present embodiment can incorporate a process of specifying a position at which a failure occurs by checking packet data at a reception point, a transmission point, and one or more relay points.

So far, the functional configuration example of the communication device 100 according to the embodiment of the present disclosure has been described using FIG. 7. Next, a functional configuration example of the packet filter unit 120 included in the communication device 100 according to the embodiment of the present disclosure will be described.

Figure 8:
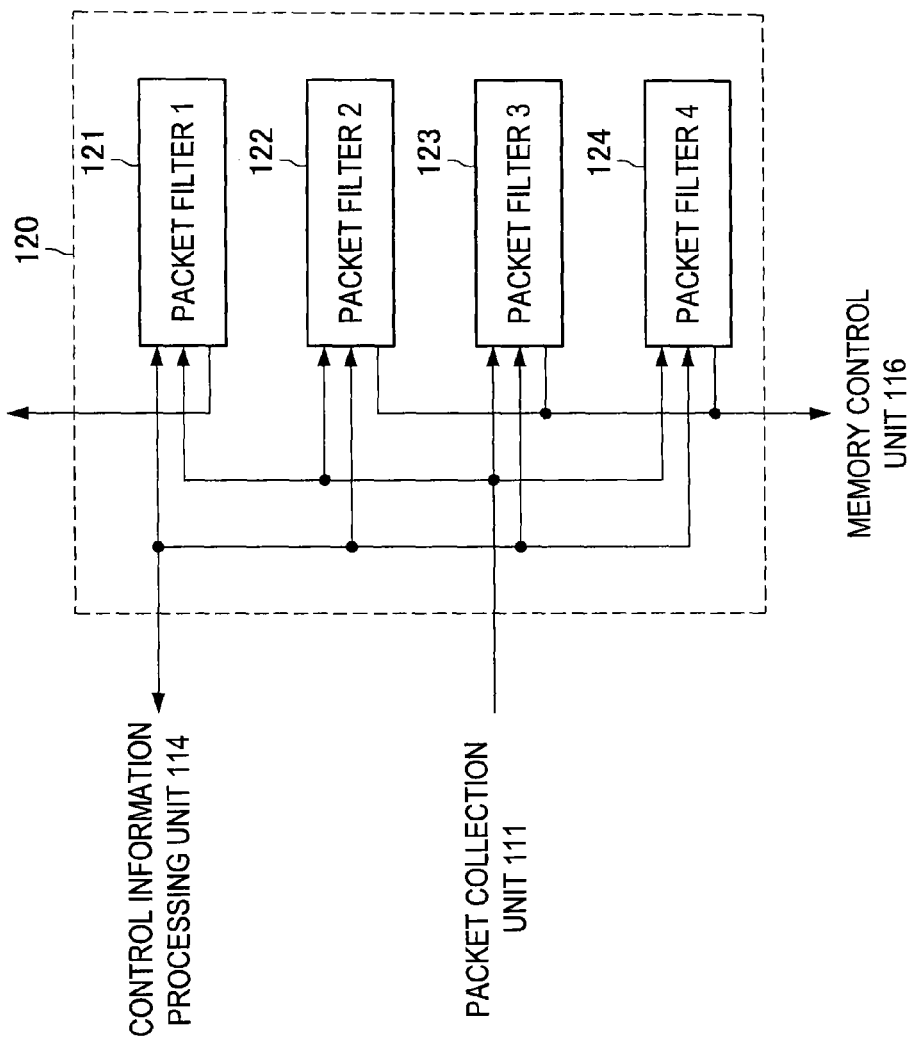
FIG. 8 is an illustrative diagram showing a functional configuration example of a packet filter unit 120.

FIG. 8 is an illustrative diagram showing the functional configuration example of the packet filter unit 120 included in the communication device 100 according to the embodiment of the present disclosure. Hereinbelow, the functional configuration example of the packet filter unit 120 included in the communication device 100 according to the embodiment of the present disclosure will be described using FIG. 8.

As shown in FIG. 8, the packet filter unit 120 is configured to include packet filters 121, 122, 123, and 124. The packet filter 121 is a filter for selecting packets to be counted by the counter 119. When packets that have or do not have designated given patterns are to be counted, the control information processing unit 114 sets the patterns or matching or non-matching of the packets with the patterns in the packet filter 121.

The packet filters 122, 123, and 124 are filters for selecting packets relating to recording of the memory 117. For example, the packet filter 122 is set to be a filter for selecting packets to be recorded on the memory 117, the packet filter 123 to be a filter for selecting a trigger packet serving as a trigger to start recording on the memory 117, and the packet filter 124 to be a filter for selecting a trigger packet serving as a trigger to stop recording on the memory 117. When packets that have or do not have the designated given patterns are to be selected, the control information processing unit 114 also sets the pattern and matching or non-matching of the packets with the pattern in the packet filters 122, 123, and 124 as in the case of the packet filter 121.

Although FIG. 8 shows the configuration in which the four packet filters 121, 122, 123, and 124 are included in the packet filter unit 120, the present disclosure is not limited to this example. The packet filter unit 120 may be configured in multiple stages or with packet filters of which the number differs according to the type of packets to be recorded on the memory 117 or the number of the counters 119.

For example, the packet filter unit 120 may have a configuration of packet filters in which a plurality of conditions for matching or non-matching with the designated give patterns are effectively set at the same time. In addition, when, for example, the packet filter 121 that selects packets to be counted by the counter 119 is configured to include a plurality of independent packet filters, the counter 119 can count transmission packets and reception packets of a plurality of different communication flows at the same time, and therefore the effect of observing throughput of each communication flow more successfully is exhibited.

So far, the functional configuration example of the packet filter unit 120 included in the communication device 100 according to the embodiment of the present disclosure has been described using FIG. 8. Next, a system operation example at the time of execution of the network monitoring function using the communication device 100 according to the embodiment of the present disclosure will be described.

[1.3. System Operation Example at the Time of Execution of a Network Monitoring Function]

Figure 9:
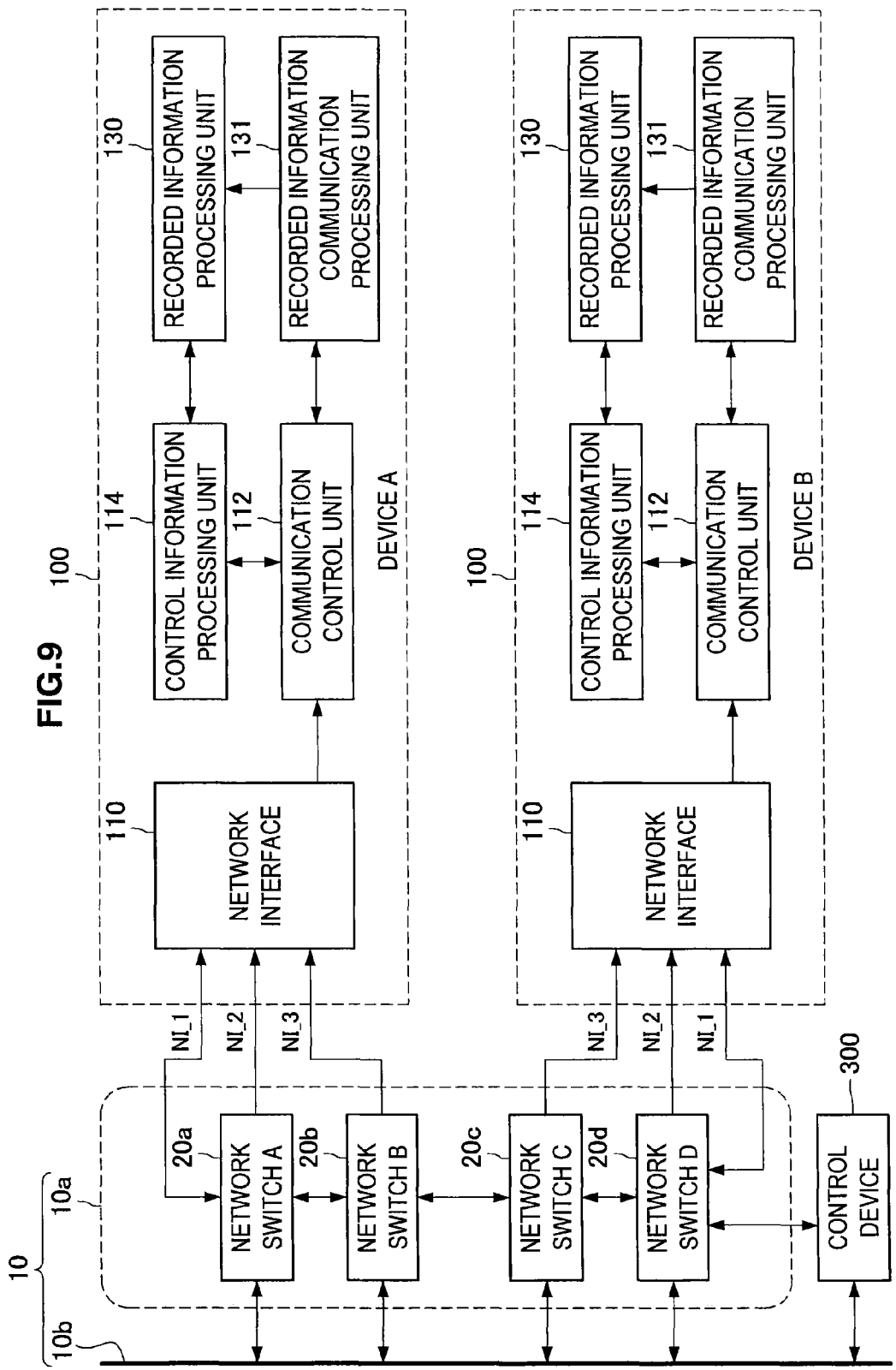
FIG. 9 is an illustrative diagram for describing a system operation example at the time of executing a network monitoring function.

FIG. 9 is an illustrative diagram for describing a system operation example at the time of the execution of the network monitoring function using the communication device 100 according to the embodiment of the present disclosure. FIG. 9 shows a configuration of a system when the network monitoring function is executed using two communication devices 100. Description will be provided by setting the two respective communication devices 100 as a device A and a device B in FIG. 9. Hereinbelow, the operation example in which the devices A and B collect recorded information under the same condition by transmitting control information generated by the device A to the device B will be described.

Note that only functional blocks to be used in the description are shown together with the devices A and B in FIG. 9.

As shown in FIG. 9, the devices A and B each include network interfaces 110 each having three network interfaces NI_1, NI_2, and NI_3. The network interface NI_1 is connected to a data communication LAN 10a to communicate video and audio data. The network interfaces NI_2 and NI_3 are connected to mirror ports of network switches 20a, 20b, 20c, and 20d constituting the data communication LAN 10a.

FIG. 9 illustrates a control device 300 which is connected to the network switches 20a, 20b, 20c, and 20d via a control LAN 10b, along with the communication devices 100 operating as the devices A and B. The control device 300 controls the network monitoring function of the devices A and B via the control LAN 10b. The control device 300 generates, for example, control information and controls the network monitoring function of the devices A and B by transmitting the control information to the devices A and B via the control LAN 10b.

In addition, the control device 300 has functions of communicating with the network switches 20a, 20b, 20c, and 20d via the control LAN 10b, performing setting of the network switches 20a, 20b, 20c, and 20d such as setting of a mirror port, and checking states.

Note that the network configuration shown in FIG. 9 is merely an example, and the present disclosure is not limited to this example. It is possible to realize configurations, for example, in which two or more network interfaces are connected to the data communication LAN, in which connection only to a mirror port of a specific network switch rather than of all the network switches constituting the data communication LAN is performed, in which connection to a tap device that has been inserted in-line to a link present in the data communication LAN rather than to a mirror port of a network switch constituting the data communication LAN is performed, in which three or more communication devices 100 are included, in which connection to a mirror port is temporarily performed upon execution of failure analysis rather than at all times, in which control of the communication devices 100 and setting of a network switch are executed by different control devices, and the like.

[1.4. Functional Configuration Example of a Control Device]

Figure 10:
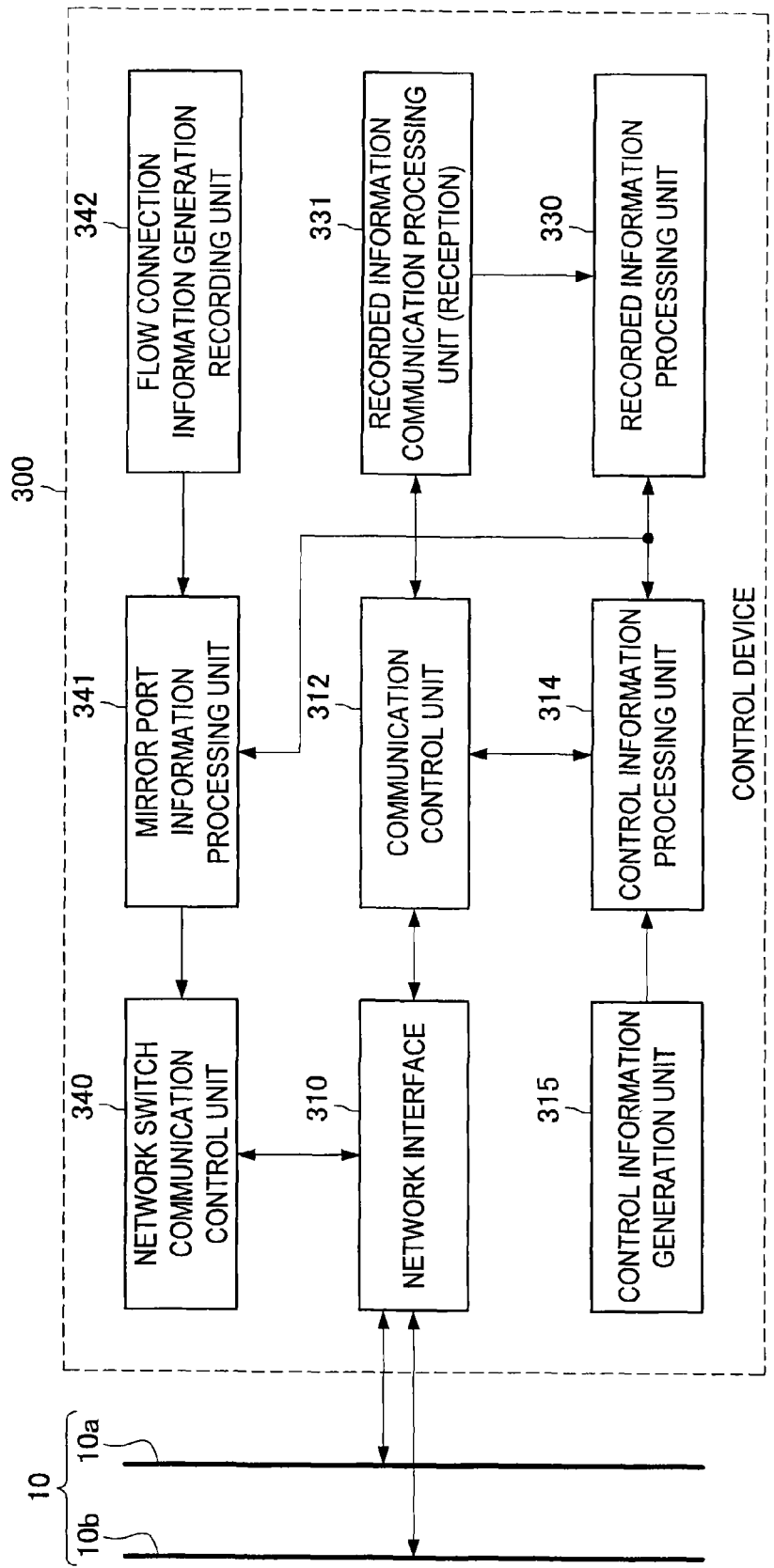
FIG. 10 is an illustrative diagram showing a functional configuration example of a control device 300 according to an embodiment of the present disclosure.

Next, a functional configuration example of the control device 300 according to the embodiment of the present disclosure will be described. FIG. 10 is an illustrative diagram showing the functional configuration example of the control device 300 according to the embodiment of the present disclosure. Hereinbelow, the functional configuration example of the control device 300 according to the embodiment of the present disclosure will be described using FIG. 10.

As shown in FIG. 10, the control device 300 according to the embodiment of the present disclosure is configured to include a network interface 310, a communication control unit 312, a control information processing unit 314, a control information generation unit 315, a recorded information processing unit 330, a recorded information communication processing unit 331, a network switch communication control unit 340, a mirror port information processing unit 341, and a flow connection information generation recording unit 342.

The network interface 310 is connected to a network constituted by the network switch group 10 and executes transmission and reception of data with other devices. In addition, the network interface 310 exchanges packets with the communication control unit 312 that has the network functions of layer 2 or higher. In addition, the network interface 310 has two network interfaces each connected to the data communication LAN 10a and the control LAN 10b.

The communication control unit 312 executes exchange of packets with the network interface 310. In addition, the communication control unit 312 executes communication of information with the control information processing unit 314 and the recorded information communication processing unit 331.

The control information processing unit 314 confirms control information generated by the control information generation unit 315 and transfers information for setting a mirror port in a network switch of the data communication LAN 10a on which a flow to be monitored flows to the mirror port information processing unit 341. In addition, the control information processing unit 314 transfers the control information for controlling the network monitoring function to the communication control unit 312.

The control information generation unit 315 generates information to be used in operations of the network monitoring function of the communication device 100 (control information) using, for example, hardware such as a keyboard, a mouse, and a display or software such as a user interface none of which is illustrated.

The control information is broadly classified into, for example, information for setting a communication flow, information for setting a condition for a packet recording operation, information for setting content of packet recording information, information for setting a monitoring operation, and the like as described above.

The recorded information processing unit 330 collects packet data and count values that are recorded information from the communication device 100 and organizes the recorded information based on the information transferred from the control information processing unit 314.

The recorded information communication processing unit 331 has functions of communicating the packet data and the count values that are recorded information organized by the recorded information processing unit 330 to another device and outputting the recorded information organized by the recorded information processing unit 330 using hardware such as a keyboard, a mouse, and a display or software such as a user interface none of which is illustrated.

The network switch communication control unit 340 logs on to a designated network switch using a communication protocol such as a Telnet based on information created by the mirror port information processing unit 341 and sets a mirror port.

The mirror port information processing unit 341 creates information for setting a mirror port that relates to a designated flow to be monitored in a designated network switch with reference to information confirmed by the flow connection information generation recording unit 342 in advance. In addition, the mirror port information processing unit 341 transfers the created information to the network switch communication control unit 340.

The flow connection information generation recording unit 342 collects information of [a network switch—a port number—a MAC address—VLAN_ID depending on a case] and [a MAC address table of a network switch] as information relating to port connection in which the network switch is recorded in the case of, for example, a layer 2 network. Note that, in the present disclosure, a method of collecting the information relating to port connection in which the network switch is recorded is not limited to a specific method. The flow connection information generation recording unit 342 generates and retains a connection table that indicates connection states of the port of network switch based on the collected information.

FIG. 11 is an illustrative diagram showing an example of content of the connection table generated by the flow connection information generation recording unit 342. For example, the flow of the number 1 of FIG. 11 indicates connection from a network interface NI_1 of a device A1 to a number 10 port of a switch A, connection from a number 11 port of the switch A to the number 10 port of a switch B, connection from a number 11 port of the switch B to a number 10 port of a switch C, connection from a number 11 port of the switch C to the number 10 port of a switch D, and connection from a number 11 port of the switch D to a network interface NI_1 of a device B1.

The mirror port information processing unit 341 decides a port number of a network switch to be monitored with reference to the connection table generated by the flow connection information generation recording unit 342 when information of the MAC address of a transmission source and the MAC address of a recipient of a flow to be monitored and information of the network switch to be monitored are designated.

When the port number of the network switch to be monitored is decided, the network switch communication control unit 340 sets mirroring in the network switch so that a flow of the port is output from a predetermined port. For example, when the flow of the number 1 of FIG. 11 is to be monitored, the switch A is set such that the number 10 port or the number 11 port is subject to mirroring according to a monitoring objective.

So far, the functional configuration example of the control device 300 according to the embodiment of the present disclosure has been described using FIG. 10. Note that, in the example of FIG. 10, although the control device 300 is described as performing setting of a mirror port in a network switch, the present disclosure is not limited to this example. For example, a configuration in which a control device that has the mirror port information processing unit 341 and the flow connection information generation recording unit 342 is separated from a control device that has the network switch communication control unit 340 is also possible. When such a configuration is realized, the former control device has an element that displays information relating to a port number of a network switch to be monitored in its own device or communicates the information to the latter control device.

[1.5. Operation Example of a Communication Device]

Figure 12:
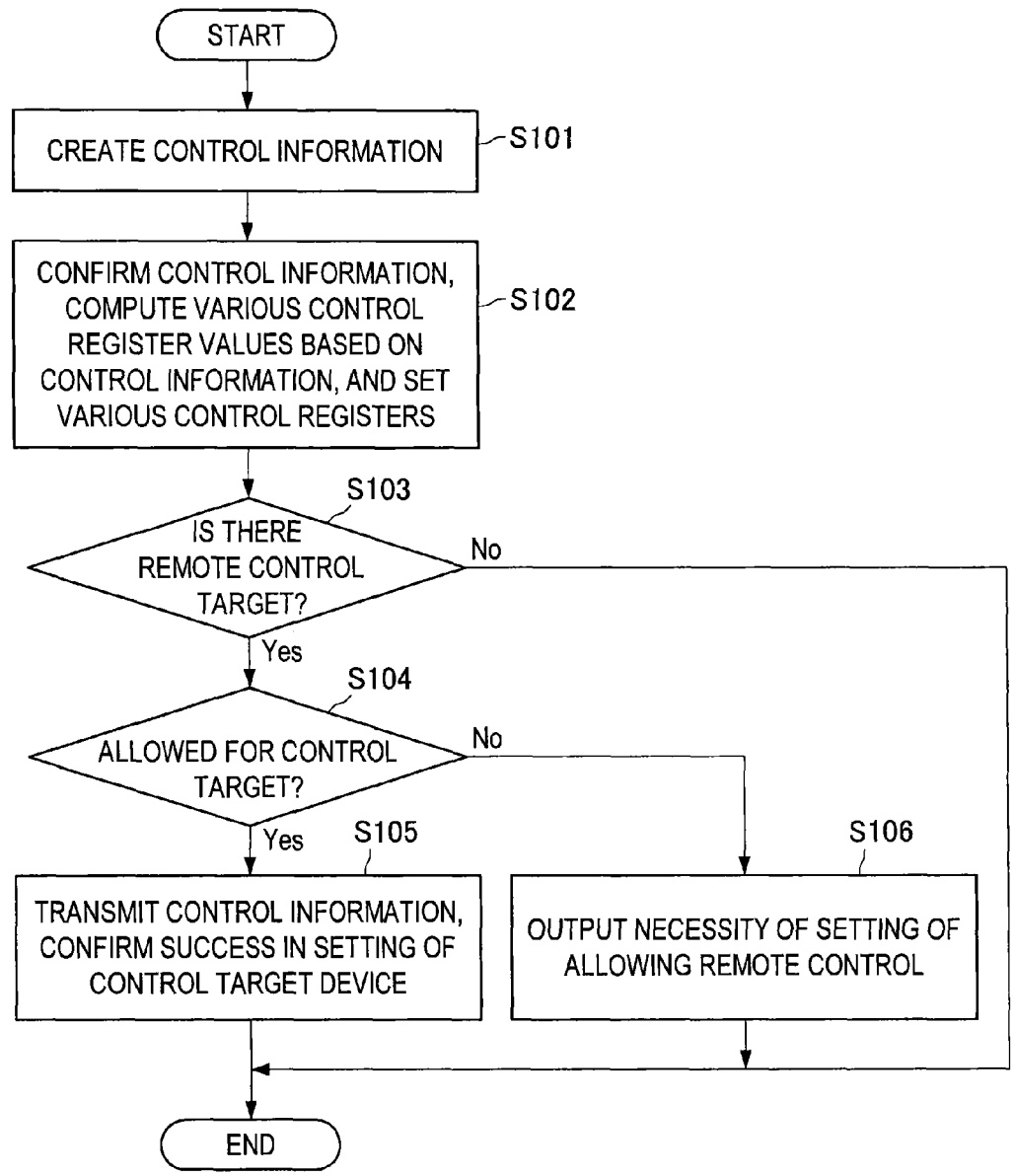
FIG. 12 is a flowchart showing an operation example of the communication device 100.

FIG. 12 is a flowchart showing an operation example of the communication device 100 according to the embodiment of the present disclosure. FIG. 12 shows the operation example of the communication device 100 in which the communication device 100 generates control information and transmits the generated control information to another device. Hereinbelow, the operation example of the communication device 100 according to the embodiment of the present disclosure will be described using FIG. 12.

The communication device 100 causes the control information generation unit 115 to create control information (Step S101). In creating the control information, the control information generation unit 115 generates information necessary for an operation of the network monitoring function of the communication device 100 using hardware such as a keyboard, a mouse, and a display or software such as a user interface as described above.

When the control information generation unit 115 has created the control information in Step S101, the communication device 100 then confirms the created control information using the control information processing unit 114, computes various control register values to be set for each functional block inside the communication device 100 based on the confirmed control information using the control information processing unit 114, and sets the various control registers for each functional block using the control information processing unit 114 (Step S102).

As described above, processing blocks with which the control information processing unit 114 exchanges the control information are the memory control unit 116, the counter control unit 118, the packet filter unit 120, the recorded information processing unit 130, and the recorded information communication processing unit 131.

Next, the communication device 100 determines whether or not there is a device to be remotely controlled by transmitting the control information using, for example, the control information processing unit 114 (Step S103). When there is no device to be remotely controlled, the communication device 100 finishes the process as is. On the other hand, when there is a device to be remotely controlled, the communication device 100 then executes communication with the target device and determines whether or not the target device is set to allow remote control using, for example, the control information processing unit 114 (Step S104).

When it is determined as a result of Step S104 described above that the target device is set allow remote control, the communication device 100 transmits the control information to the target device through the control information processing unit 114, the communication control unit 112, and the network interface 110. Then, the communication device 100 confirms that a setting of the control information in the remote control target device has succeeded based on a response from the target device (Step S105).

On the other hand, when it is determined as a result of step S104 that the target device is not set to allow remote control, the communication device 100 outputs information that it is necessary to set the target device to allow remote control for execution of the remote control of the target device to, for example, a display device that is not illustrated (Step S106). By outputting the information that it is necessary to set the target device to allow remote control, the communication device 100 can notify a user of the necessity of changing the setting of the target device.

Note that the setting of allowing remote control is executed, for example, while each device executes the process of creating the control information in Step S101 described above.

So far, the operation example of the communication device 100 in which the control information is generated by the communication device 100 and the generated control information is transmitted to another device has been described.

Next, an example of a packet recording processing method by the communication device 100 according to the embodiment of the present disclosure will be described. The communication device 100 according to the embodiment of the present disclosure retains packets using detection of discontinuity of a packet ID of a received packet as a trigger.

Figure 13:
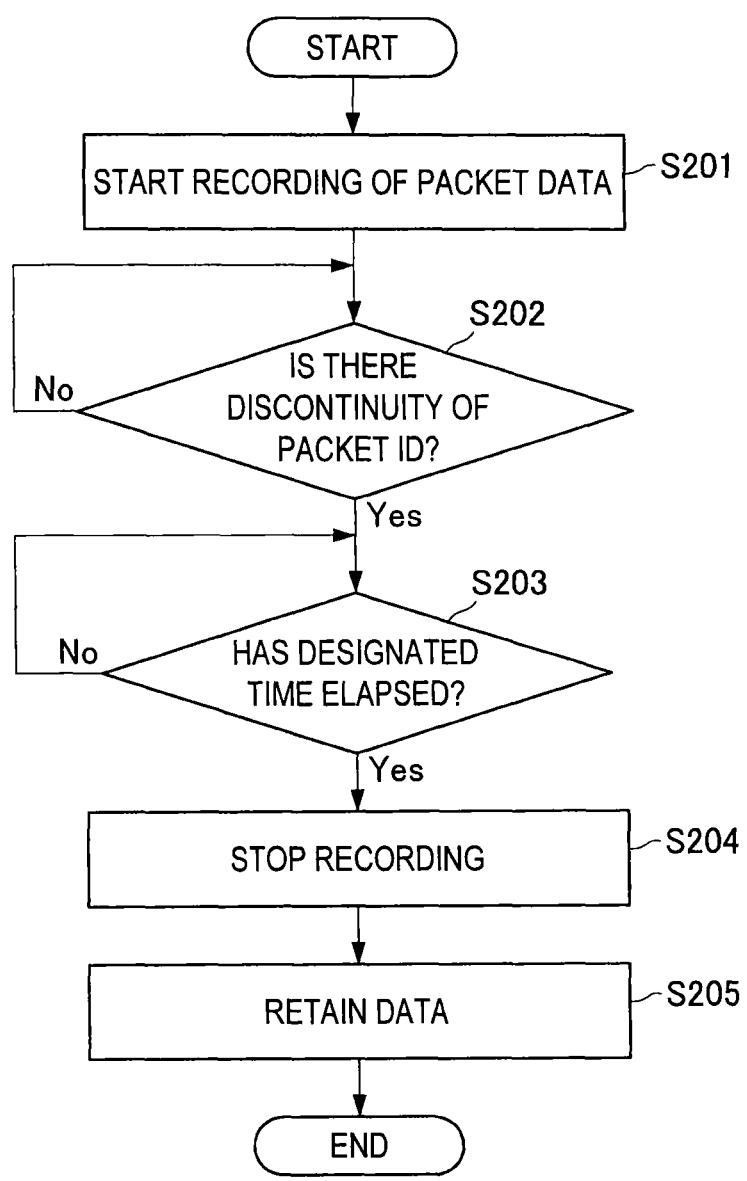
FIG. 13 is a flowchart showing another operation example of the communication device 100.

FIG. 13 is a flowchart showing the operation example of the communication device 100 according to the embodiment of the present disclosure. FIG. 13 shows the operation example in which packets are retained using detection of discontinuity of a packet ID of a received packet as a trigger. Hereinbelow, the operation example of the communication device 100 according to the embodiment of the present disclosure will be described using FIG. 13.

When start instruction information to start recording of packets is generated based on processes of the information processing unit 113 and the packet filter unit 120, the communication device 100 starts recording of packets on the memory 117 using the memory control unit 116 (Step S201).

Then, the communication device 100 stands by until discontinuity of a packet ID occurs (No in Step S202), and when the packet ID analysis unit 140 detects occurrence of discontinuity of a packet ID (Yes in Step S202), the device transitions to a recording stop process.

Note that the start instruction of the recording of packet data may be generated based on the processes of the information processing unit 113 and the packet filter unit 120, and may be generated when the control information generation unit 115 instructs a recording start and the control information processing unit 114 confirms the instruction.

There are cases in which, when a plurality of spots of the data communication LAN are monitored at the same time in the communication device 100 that has the plurality of network interfaces as shown in FIG. 7, discontinuity of a packet ID continuously occurs a plurality of times. Thus, the communication device 100 stands by for a designated time (for example, for one second) (Step S203), and causes the memory control unit 116 to stop recording of packet data on the memory 117 when the designated time elapses (Step S204). Then, the communication device 100 transfers the packet data recorded on the memory 117 to, for example, an area for internal retention of the memory 117 and retains the packet data (Step S205).

Figure 14:
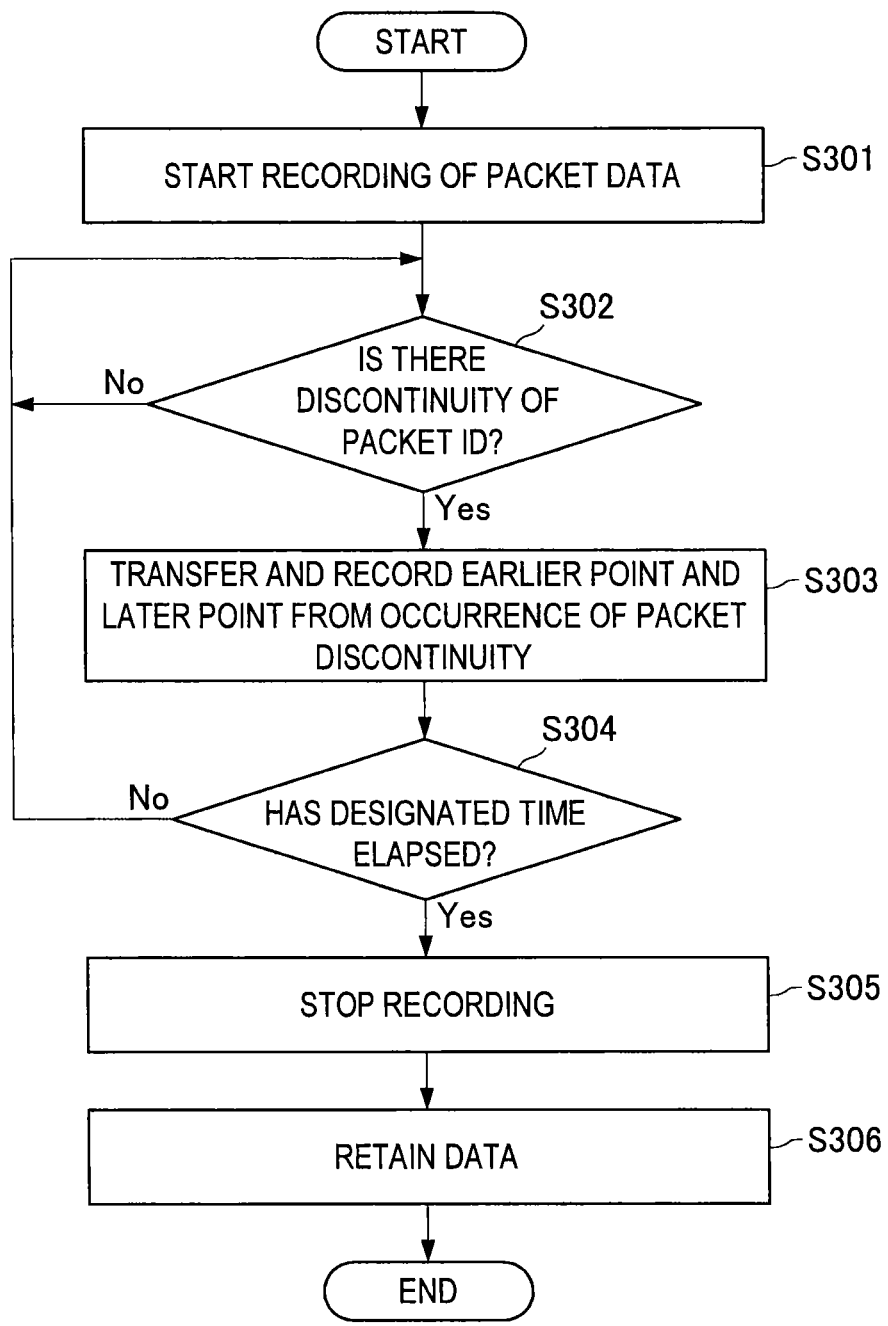
FIG. 14 is a flowchart showing still another operation example of the communication device 100.

FIG. 14 is a flowchart showing another operation example of the communication device 100 according to the embodiment of the present disclosure. FIG. 14 shows the operation example of retaining packets using detection of discontinuity of a packet ID of received packets as a trigger. Hereinbelow, the operation example of the communication device 100 according to the embodiment of the present disclosure will be described using FIG. 14.

When start instruction information for starting recording of packets is generated based on processes of the information processing unit 113 and the packet filter unit 120, the communication device 100 causes the memory control unit 116 to start recording of packet data on the memory 117 (Step S301).

Then, the communication device 100 stands by until discontinuity of a packet ID occurs (No in Step S302), and when the packet ID analysis unit 140 detects occurrence of discontinuity of a packet ID (Yes in Step S302), the communication device transitions to a recording stop process.

Note that an instruction to start recording of packet data may be generated based on processes of the information processing unit 113 and the packet filter unit 120, and may be generated as the control information generation unit 115 instructs a start of recording and the control information processing unit 114 confirms the instruction.

When discontinuity of a packet ID occurs, the communication device 100 causes the memory control unit 116 to execute control such that packets in a predetermined range that includes the front and the rear of the spot at which discontinuity of the packet IDs has occurred are transferred to an area for retention of the memory 117 (Step S303). Then, the communication device 100 stands by for a designated time (for example, for one second) (Step S304), and then causes the memory control unit 116 to stop recording of packet data on the memory 117 when the designated time elapses (Step S305). Then, the communication device 100 transfers the packet data recorded on the memory 117 to, for example, an area for internal retention of the memory 117 and then retains the packet data (Step S306).

Figure 15:
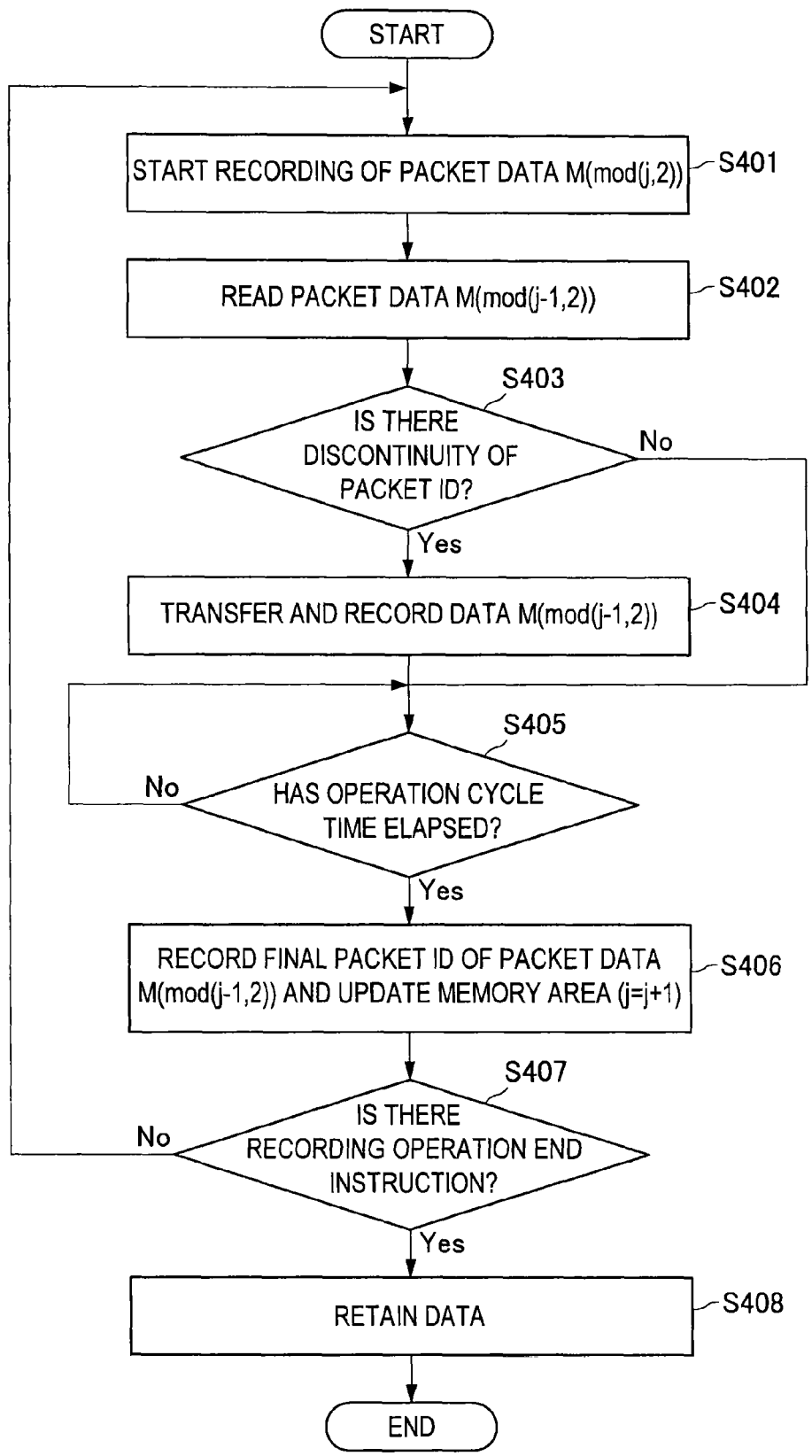
FIG. 15 is a flowchart showing still another operation example of the communication device 100.

FIG. 15 is a flowchart showing still another operation example of the communication device 100 according to the embodiment of the present disclosure. FIG. 15 shows the operation example of retaining packets using detection of discontinuity of a packet ID of a received packet as a trigger. Hereinbelow, the operation example of the communication device 100 according to the embodiment of the present disclosure will be described using FIG. 15.

Hereinbelow, a case in which writing on the memory 117 and reading from the memory 117 are executed at the same time using memory areas M(0) and M(1) of the memory 117 for two kinds of works cycling in time series will be described.

The communication device 100 causes the memory control unit 116 to execute writing of packet data in a memory area M(mod(j,2)) (Step S401) and reading of packet data from a memory area M(mod(j−1, 2)) (Step S402).

Then, the communication device 100 causes the packet ID analysis unit 140 to analyze whether or not discontinuity of a packet ID has occurred in the packet data read from the memory area M(mod(j−1, 2)) (Step S403). When discontinuity of a packet ID is analyzed to have occurred in Step S403 (Yes of Step S403), the memory control unit 116 transfers the packet data stored in the memory area M(mod (j−1, 2)) to a memory area for retention of the memory 117 (Step S404). When discontinuity of a packet ID is analyzed not to have occurred, the process of Step S404 is skipped.

Then, the communication device 100 causes the memory control unit 116 to determine the elapse of a given recording operation time that is designated as a cycle of writing of the packet data on the work memory area of the memory 117 and reading of the packet data from the work memory area (Step S405). When the designated given recording operation time has elapsed (Yes of Step S405), the packet ID of the final packet in the current reading memory area is recorded and the order of work memory areas is updated once in order to determine whether or not discontinuity of a packet ID has occurred in the leading packet of the next reading memory area (Step S406).

Then, the communication device 100 causes the memory control unit 116 to check issuance of an instruction for finishing the packet recording operation (Step S407), and when the instruction for finishing the packet recording operation has been issued, the communication device 100 transfers information of occurrence or non-occurrence of discontinuity of a packet ID and the packet data recorded on the memory 117 to, for example, the area for internal retention of the memory 117 and retains the data (Step S408).

Figure 16:
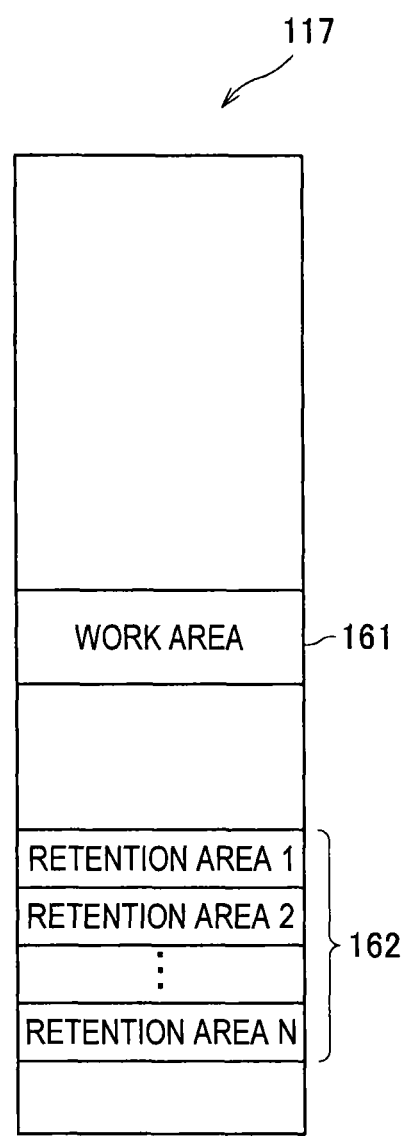
FIG. 16 is an illustrative diagram showing a configuration example of a memory.

FIG. 16 is an illustration diagram showing areas of the memory 117 used in the operation example shown in FIG. 15. In FIG. 16, the memory areas M(0) and M(1) of the memory 117 for two kinds of works cycling in time series are set as a work area 161 shown in FIG. 16, and a transfer destination of the packet data when the condition of Step S403 described above is satisfied is set as a retention area 162 of the memory 117. The memory control unit 116 transfers the packet data from the work area 161 to retention areas in order from a first retention area. In addition, a maximum number N of the retention areas is instructed by the control information processing unit 114.

The communication device 100 according to the embodiment of the present disclosure executes the operation described above, and thereby can retain the packet data recorded on the memory 117 in the internal retention area of the memory 117 using occurrence of discontinuity of a packet ID as a trigger.

2. Hardware Configuration

Each of the algorithms described above can be performed by using, for example, the hardware configuration shown in FIG. 17. That is, the processing of each of the algorithms can be realized by controlling the hardware shown in FIG. 17 using a computer program. Note that the mode of this hardware is arbitrary, and may be, for example, a personal computer, a mobile information terminal such as a mobile phone, a PHS or a PDA, a game machine, a contact or non-contact IC chip, a contact or non-contact IC card, or various types of information appliances. Moreover, the PHS is an abbreviation for Personal Handy-phone System. Also, the PDA is an abbreviation for Personal Digital Assistant.

As shown in FIG. 17, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, and controls entire operation or a part of the operation of each structural element based on various programs recorded on the ROM 904, the RAM 906, the storage unit 920, or a removable recording medium 928. The ROM 904 is a device for storing a program to be read by the CPU 902 or data or the like used in an arithmetic operation. The RAM 906 temporarily or perpetually stores, for example, a program to be read by the CPU 902 or various parameters or the like appropriately changed in execution of the program.

These structural elements are connected to each other by for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote controller that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. The CRT is an abbreviation for Cathode Ray Tube. In addition, the LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removable recording medium 928, for example, a magnetic disk, an optical disc, a magneto-optical disc, or a semiconductor memory, or writes information in the removable recording medium 928. The removable recording medium 928 is, for example, a DVD medium, a Blu-ray medium, an HD-DVD medium, various types of semiconductor storage media, or the like. Of course, the removable recording medium 928 may be, for example, an electronic device or an IC card on which a non-contact IC chip is mounted. The IC is an abbreviation for Integrated Circuit.

The connection port 924 is, for example, a USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. The USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. In addition, the network 932 connected to the communication unit 926 is configured from a wire-connected or wirelessly connected network, and is the Internet, a home-use LAN, infrared communication, visible light communication, broadcasting, or satellite communication, for example. The LAN is an abbreviation for Local Area Network. Also, the WUSB is an abbreviation for Wireless USB. Furthermore, the ADSL is an abbreviation for Asymmetric Digital Subscriber Line.

3. Conclusion

According to the embodiments of the present disclosure described above, the communication device 100 that effectively monitors the network in a network system constituted by a plurality of communication devices, particularly, in a network system constituted by communication devices that process video data and audio data, is provided.

The communication device 100 according to the embodiments of the present disclosure generates control information to be used in operations of the network monitoring function, sets a value in a register based on the control information, and transmits the control information to another communication device 100 serving as a counterpart in a communication flow. The other communication device 100 which has received the control information generates a register value appropriate for the device itself and sets the value in the register.

The communication device 100 according to the embodiments of the present disclosure can effectively monitor the network in the network system constituted by the plurality of communication devices 100, particularly, the network system constituted by the communication devices 100 that process video data and audio data by transmitting the generated control information to another communication device 100.

In addition, the communication device 100 according to the embodiments of the present disclosure can detect discontinuity of a packet ID of collected packets, select a packet to be recorded from the collected packets, and start recording of the packet using occurrence of the discontinuity of a packet ID as a trigger, and can also instruct another communication device 100 to start recording of a packet.

It may not be necessary to chronologically execute respective steps in the processing, which is executed by each device of this specification, in the order described in the sequence diagrams or the flow charts. For example, the respective steps in the processing which is executed by each device may be processed in the order different from the order described in the flow charts, and may also be processed in parallel.

Furthermore, it becomes possible to generate a computer program which makes a hardware device, such as a CPU, a ROM, and a RAM incorporated in each device demonstrate the functions equivalent to the configurations of the above described devices. In addition, it becomes also possible to provide a storage medium which stores the computer program. In addition, respective functional blocks shown in the functional block diagrams may be constituted from hardware devices so that a series of processes may be implemented by the hardware devices.

While the preferred embodiments of the present disclosure have been described so far with reference to the accompanying drawings, the technical scope of the present disclosure is not limited to these examples. It should be understood by those skilled in the art that various modifications, combinations, sub-combinations and alterations may occur depending on design requirements and other factors insofar as they are within the scope of the appended claims or the equivalents thereof.

Further, the effect described in the present specification is not limited to only that described or illustrated. That is, the technology according to the present disclosure accomplishes other effects which are clear to a person skilled in the art from the description of the present specification, along with the above described effect or instead of the above described effect.

Additionally, the present technology may also be configured as below.

(1) A communication device including:
 a network interface connected to a network;
 a packet collection unit configured to collect packets transmitted from the network interface and packets received by the network interface;
 a packet recording unit configured to select a packet to be recorded from the packets collected by the packet collection unit and to record the packet as recorded information; and
 a packet analysis unit configured to detect discontinuity of a packet ID of the packets collected by the packet collection unit,
 wherein, when the packet analysis unit detects discontinuity of a packet ID, the packet recording unit retains the recorded information that has been recorded.

(2) The communication device according to (1), wherein, when the packet analysis unit detects discontinuity of a packet ID, the packet recording unit stops recording of the recorded information and retains the recorded information.

(3) The communication device according to (1) or (2), wherein, when the packet analysis unit detects discontinuity of a packet ID, the packet recording unit transfers recorded information of a predetermined range that includes an earlier point and a later point from the time point at which the packet analysis unit detects discontinuity of a packet ID to a recording area for retention.

(4) The communication device according to any one of (1) to (3), wherein the packet recording unit controls repetitive writing and reading of the recorded information on and from a recording area for temporary storage, and transfers the recorded information from the recording area for temporary storage to a recording area for retention when the packet analysis unit detects discontinuity of a packet ID.

(5) The communication device according to any one of (1) to (4), wherein the packet analysis unit detects discontinuity of a packet ID by detecting discontinuity of an identifier of the IPv4 header.

(6) The communication device according to any one of (1) to (4), wherein the packet analysis unit detects discontinuity of a packet ID by detecting discontinuity of the identifier of the IPv6 extension header.

(7) The communication device according to any one of (1) to (6), wherein the network interface is plural in number.

(8) The communication device according to any one of (1) to (7), further including:
 a control information generation unit configured to generate control information that includes information to be used in a packet monitoring operation and instruction information.

(9) The communication device according to (8), further including:
 a communication control unit configured to transmit the control information generated by the control information generation unit to another device.

(10) A packet monitoring method including:
 collecting packets transmitted from a network interface connected to a network and packets received by the network interface;
 selecting a packet to be recorded from the collected packets and recording the packet as recorded information;
 detecting discontinuity of a packet ID of the collected packets; and
 stopping recording of the recorded information and retaining the recorded information when discontinuity of a packet ID is detected.

(11) A computer program causing a computer to execute:
 collecting packets transmitted from a network interface connected to a network and packets received by the network interface;
 selecting a packet to be recorded from the collected packets and recording the packet as recorded information;
 detecting discontinuity of a packet ID of the collected packets; and
 stopping recording of the recorded information and retaining the recorded information when discontinuity of a packet ID is detected.

What is claimed is:

1. A communication device, comprising:
 circuitry configured to
  connect to a source communication device via a network;
  collect first packets received from the source communication device by the circuitry;
  detect discontinuity of a packet ID of the first packets collected by the circuitry, wherein,
   when the circuitry detects the discontinuity of the packet ID, the circuitry retains the collected first packets and sends a monitoring request to the source communication device, and
   upon receiving the monitoring request, the source communication device monitors second packets that are sent to the communication device;
  receive, from the source communication device, a monitoring result collected by the source communication device; and
  determine a cause of the discontinuity based on the monitoring result received from the source communication device.

2. The communication device according to claim 1, wherein, when the circuitry detects the discontinuity of the packet ID, the circuitry stops recording of the collected first packets and retains the collected first packets.

3. The communication device according to claim 1, wherein, when the circuitry detects the discontinuity of the packet ID, the circuitry transfers a predetermined range of the collected first packets to a recording area for retention, the predetermined range including an earlier point and a later point from the time point at which the circuitry detects the discontinuity of the packet ID.

4. The communication device according to claim 1, wherein the circuitry controls repetitive writing and reading of the collected first packets on and from a recording area for temporary storage, and transfers the collected first packets from the recording area for temporary storage to a recording area for retention when the circuitry detects the discontinuity of the packet ID.

5. The communication device according to claim 1, wherein the circuitry detects the discontinuity of the packet ID by detecting discontinuity of an identifier of a IPv4 header of the first packets.

6. The communication device according to claim 1, wherein the circuitry detects the discontinuity of the packet ID by detecting discontinuity of an identifier of a IPv6 extension header of the first packets.

7. The communication device according to claim 1, wherein the communication device is connected to a plurality of other communication devices over the network, and the source communication device is one of the plurality of other communication devices.

8. The communication device according to claim 1, wherein the circuitry is further configured to generate control information that includes information to be used in a packet monitoring operation and instruction information.

9. The communication device according to claim 8, wherein the circuitry is further configured to transmit the control information generated by the circuitry to another device.

10. A packet monitoring method performed by a communication device, the packet monitoring method comprising:
connecting, by circuitry of the communication device, a source communication device via a network,
collecting, by the circuitry, first packets received from the source communication device by the circuitry;
detecting, by the circuitry, discontinuity of a packet ID of the collected first packets;
retaining, by the circuitry, the collected first packets and sending, by the circuitry, a monitoring request to the source communication device when the discontinuity of the packet ID is detected, wherein
upon receiving the monitoring request, the source communication device monitors second packets that are sent to the communication device;
receiving, by the circuitry from the source communication device, a monitoring result collected by the source communication device; and
determining, by the circuitry, a cause of the discontinuity based on the monitoring result received from the source communication device.

11. A non-transitory computer-readable storage medium including a program stored thereon, which, when executed by a communication device including circuitry, causes the circuitry to:
connect to a source communication device via a network;
collect first packets received from the source communication device by the circuitry;
detect discontinuity of a packet ID of the collected first packets;
retain the collected first packets and send a monitoring request to the source communication device when the discontinuity of the packet ID is detected, wherein
upon receiving the monitoring request, the source communication device monitors second packets that are sent to the communication device;
receive, from the source communication device, a monitoring result collected by the source communication device; and
determine a cause of the discontinuity based on the monitoring result received from the source communication device.

\* \* \* \* \*